United States Patent
Maeda

(10) Patent No.: US 7,989,097 B2
(45) Date of Patent: Aug. 2, 2011

(54) PERPENDICULAR MAGNETIC RECORDING MEDIUM WITH TILTED EASY AXIS OF MAGNETIZATION, METHOD OF MANUFACTURING MAGNETIC RECORDING MEDIUM, AND MAGNETIC RECORDING APPARATUS COMPRISING MAGNETIC RECORDING MEDIUM

(75) Inventor: Tomoyuki Maeda, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 787 days.

(21) Appl. No.: 11/492,809

(22) Filed: Jul. 26, 2006

(65) Prior Publication Data
US 2007/0026262 A1 Feb. 1, 2007

(30) Foreign Application Priority Data
Jul. 26, 2005 (JP) .................... 2005-216199

(51) Int. Cl.
G11B 5/66 (2006.01)

(52) U.S. Cl. ............ 428/831.2; 428/827; 428/828; 428/828.1; 428/829

(58) Field of Classification Search .......... 428/827, 428/829, 831.2
See application file for complete search history.

(56) References Cited

U.S. PATENT DOCUMENTS

| | | | |
|---|---|---|---|
| 5,700,593 | A | 12/1997 | Okumura et al. |
| 7,094,483 | B2 * | 8/2006 | Pelhos et al. ............ 428/832 |
| 2002/0048695 | A1 | 4/2002 | Sakawaki et al. |
| 2002/0160234 | A1 | 10/2002 | Sakawaki et al. |
| 2003/0175556 | A1 | 9/2003 | Sakawaki et al. |
| 2004/0013909 | A1 * | 1/2004 | Shimizu et al. ........ 428/694 MM |
| 2004/0072022 | A1 * | 4/2004 | Kanbe et al. .................. 428/692 |
| 2004/0106009 | A1 | 6/2004 | Nakamura et al. |
| 2004/0191578 | A1 * | 9/2004 | Chen et al. ............... 428/694 TS |
| 2005/0227120 | A1 * | 10/2005 | Ichihara et al. ............... 428/830 |
| 2006/0002026 | A1 * | 1/2006 | Stipe et al. .................... 360/135 |

FOREIGN PATENT DOCUMENTS

| | | |
|---|---|---|
| JP | 4-206017 | 7/1992 |
| JP | 09-120527 | 5/1997 |
| JP | 2000-331207 | 11/2000 |
| JP | 2005-078796 | 3/2005 |

OTHER PUBLICATIONS

Danish Search Report dated Mar. 12, 2007 for Appln. No. 2006046080-0.
Kai-Zhong Gao et al., "Magnetic Recording Configuration for Densities Beyond 1 Tb/in2 and Data Rates Beyond 1 Gb/s," IEEE Transaction on Magnetics, vol. 38 (No. 6), p. 3675-3683, (Nov. 2002).

* cited by examiner

*Primary Examiner* — Holly Rickman
*Assistant Examiner* — Linda Chau
(74) *Attorney, Agent, or Firm* — Pillsbury Winthrop Shaw Pittman, LLP

(57) ABSTRACT

According to one embodiment, a magnetic recording medium includes a substrate, a first underlayer formed on the substrate and including an amorphous alloy containing Ni, a crystalline second underlayer formed on the first underlayer and including simple Cr or an alloy containing Cr, and a magnetic recording layer formed on the second underlayer and including at least one element of Fe and Co and at least one element of Pt and Pd, and containing magnetic crystal grains having an $L1_0$ structure. An oxygen amount remaining on the upper surface of the second underlayer is larger than an oxygen amount remaining on the lower surface of the second underlayer, and a normal line to a (001) plane of the magnetic crystal grains in the magnetic recording layer is oriented with a tilt angle in a range of 3 to 25° to a normal line to a medium plane.

7 Claims, 13 Drawing Sheets

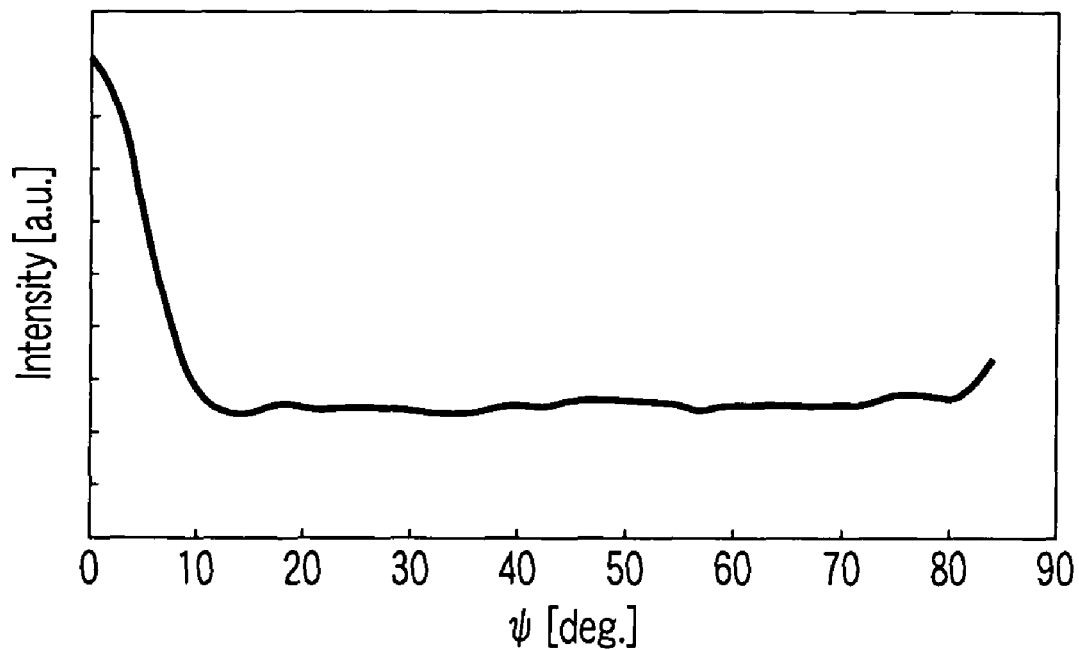
F I G. 12
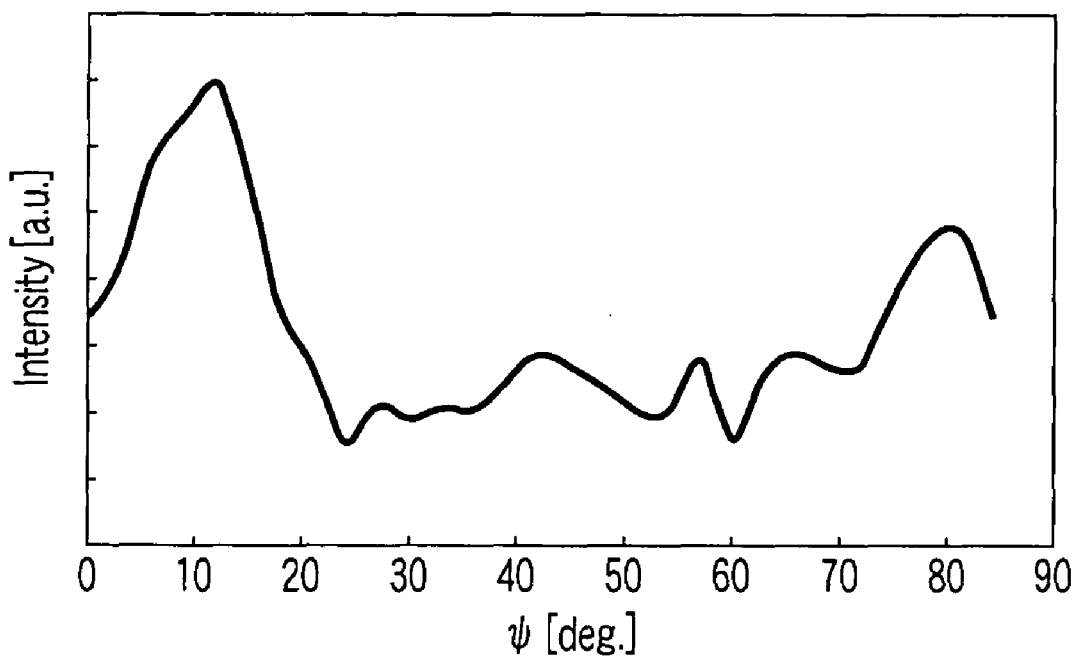
F I G. 13

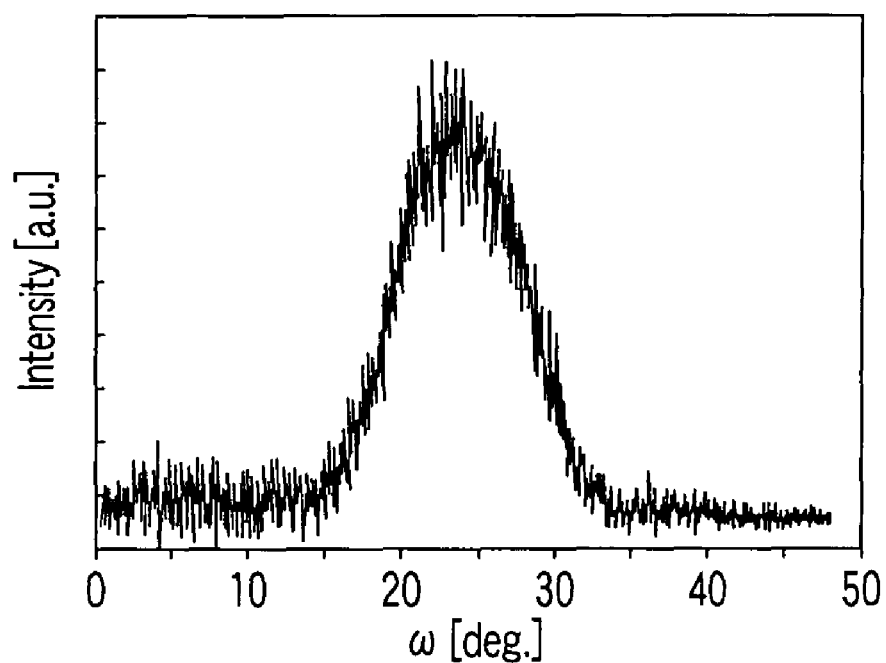
F I G. 16
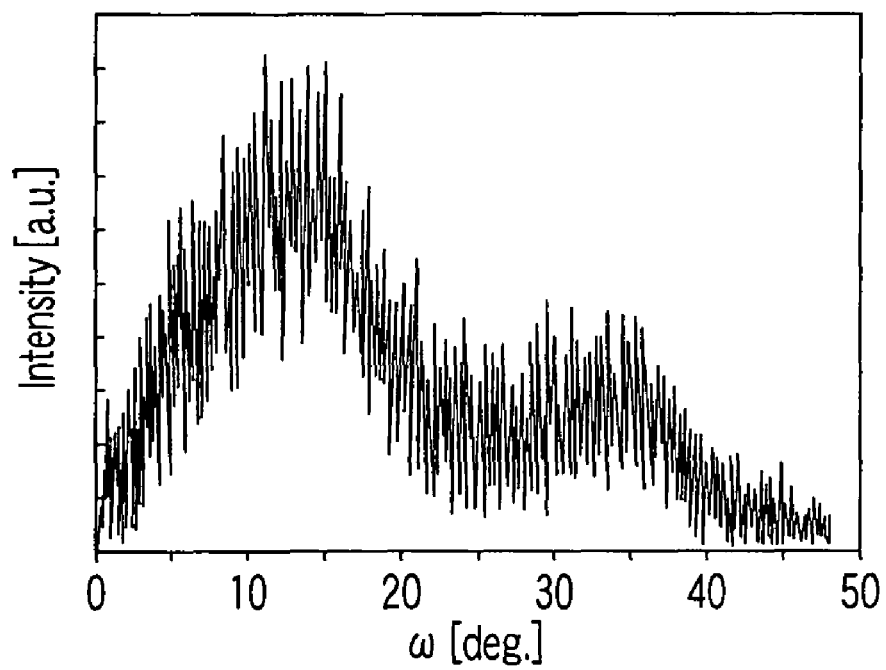
F I G. 17

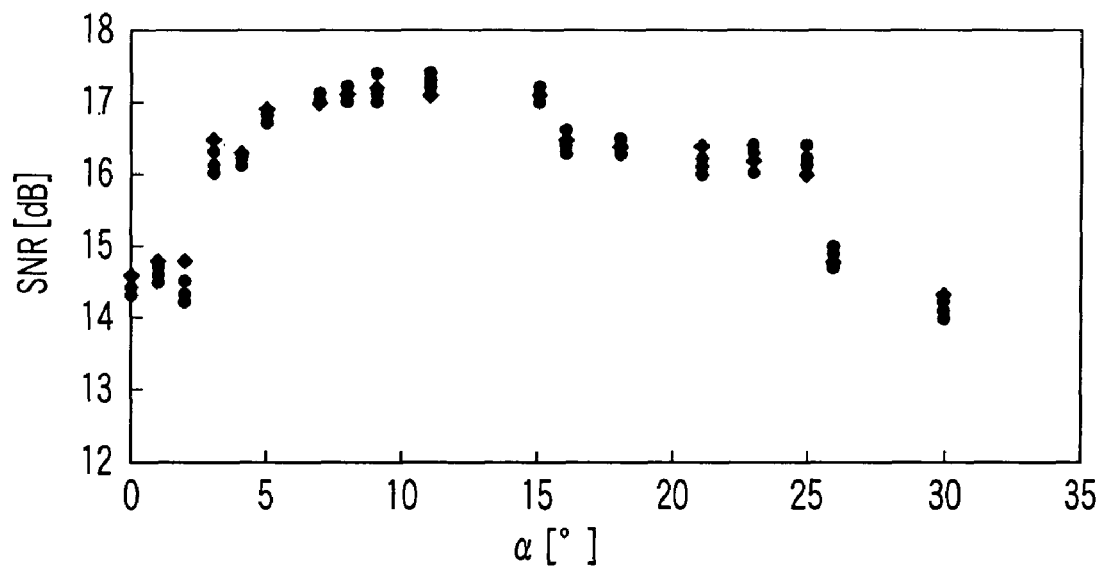
F I G. 18
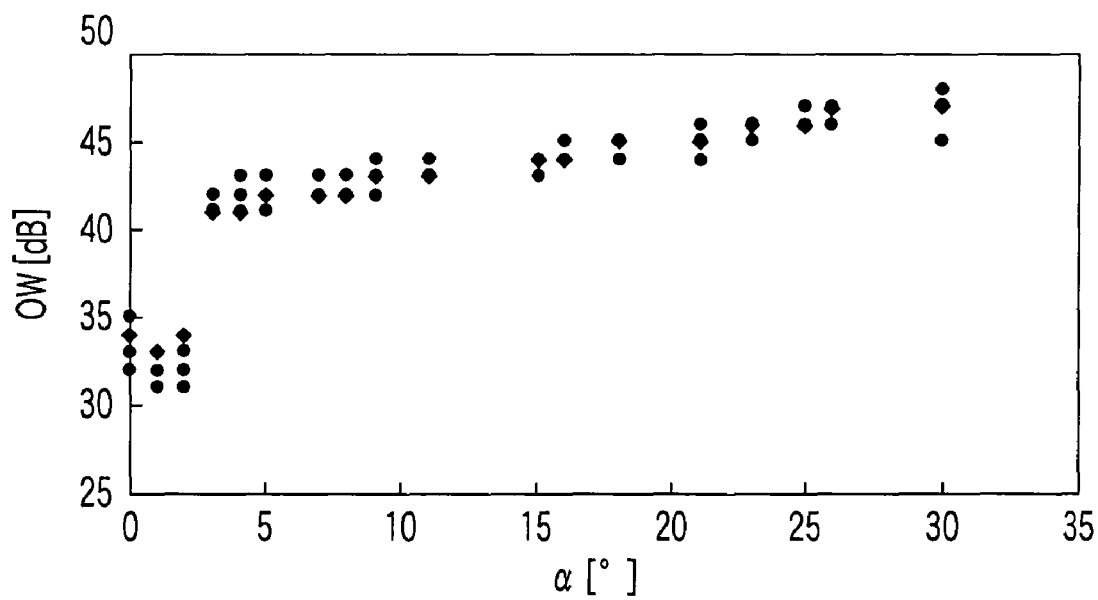
F I G. 19

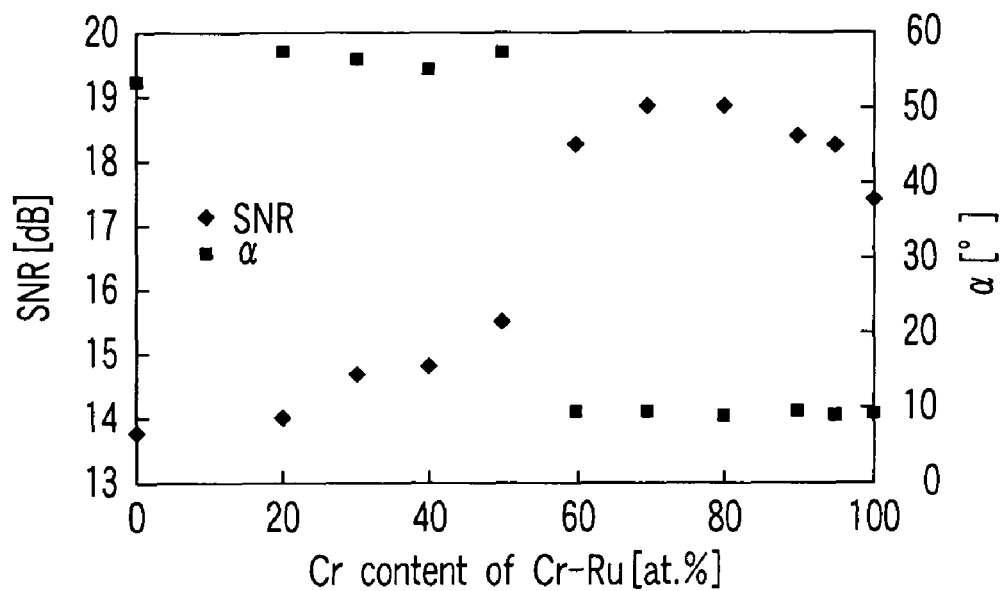
F I G. 22
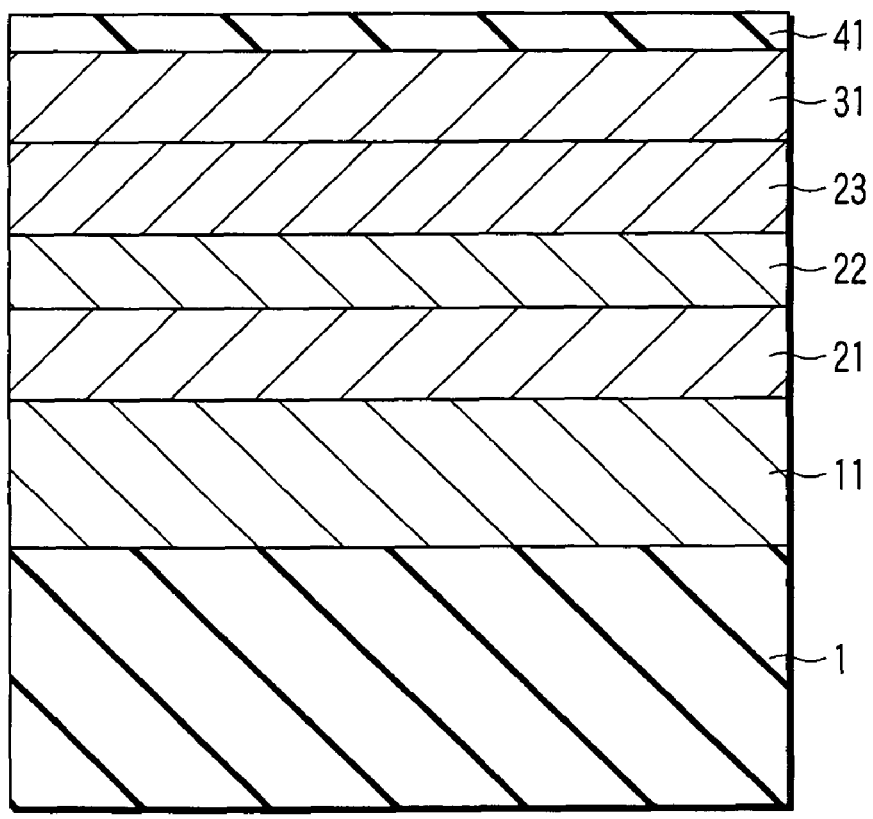
F I G. 23

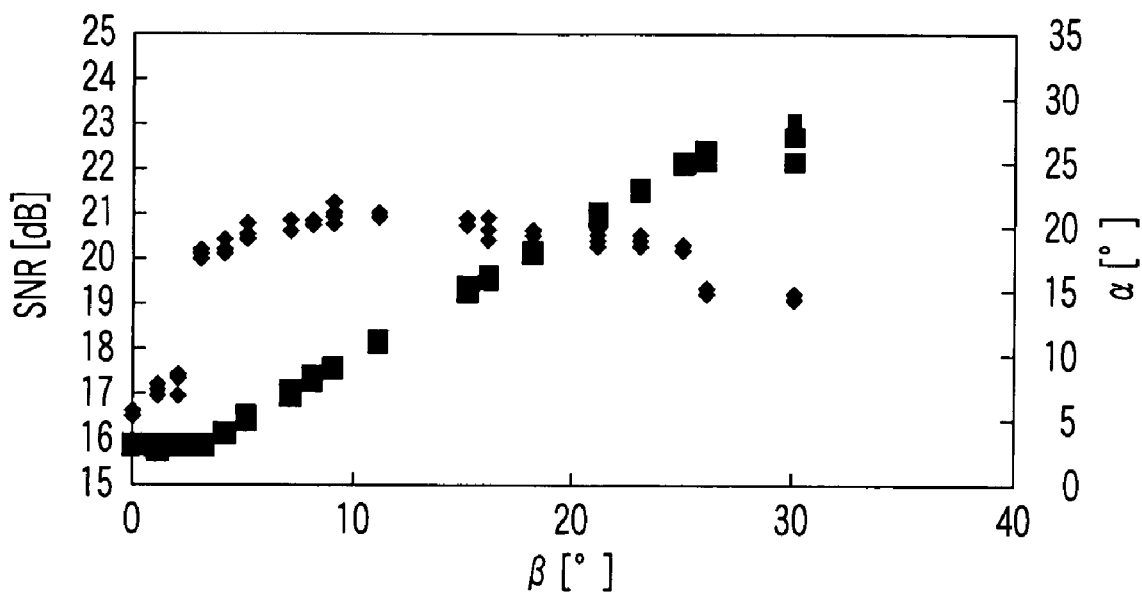
F I G. 24
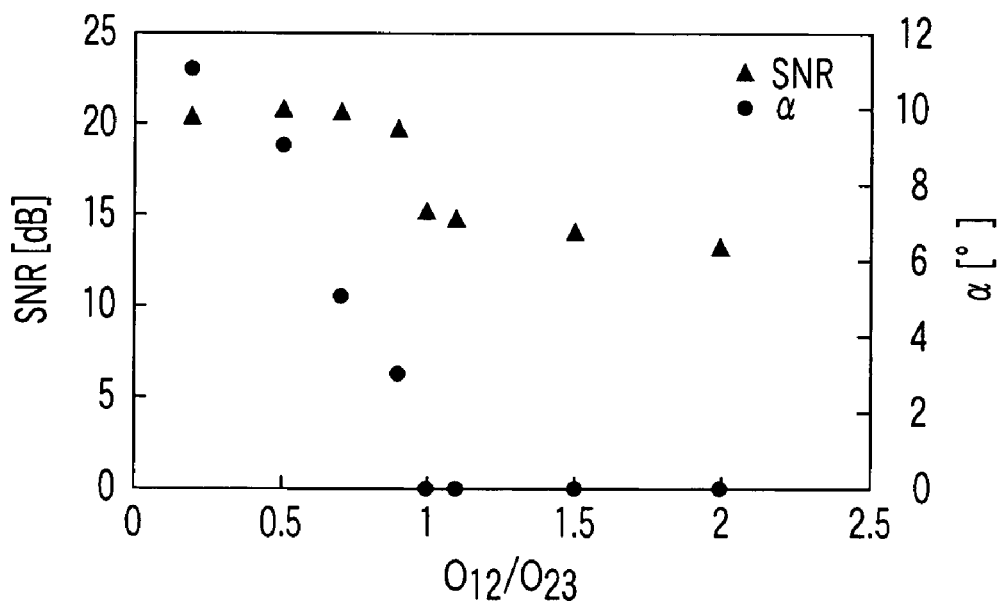
F I G. 25

PERPENDICULAR MAGNETIC RECORDING MEDIUM WITH TILTED EASY AXIS OF MAGNETIZATION, METHOD OF MANUFACTURING MAGNETIC RECORDING MEDIUM, AND MAGNETIC RECORDING APPARATUS COMPRISING MAGNETIC RECORDING MEDIUM

CROSS-REFERENCE TO RELATED APPLICATIONS

This application is based upon and claims the benefit of priority from Japanese Patent Application No. 2005-216199, filed Jul. 26, 2005, the entire contents of which are incorporated herein by reference.

BACKGROUND

1. Field

One embodiment of the present invention relates to a magnetic recording medium used for a hard disk drive using a magnetic recording technology, a method of manufacturing the magnetic recording medium, and a magnetic recording apparatus comprising the magnetic recording medium.

2. Description of the Related Art

Higher speed and higher recording density have been required for a magnetic recording apparatus (HDD) to read and write information in accordance with improved processing speed of computers in recent years. The main recording system of a currently available HDD is a longitudinal recording system in which the magnetization direction of the medium is oriented to the in-plane direction. However, a perpendicular recording system is suitable for the purpose of higher recording density, since demagnetizing fields in the vicinity of magnetization transitions are small and sharply reversed magnetizations can be provided in this system. In addition, since the recording layer can be designed to be thicker in the perpendicular magnetic recording medium as compared with the longitudinal magnetic recording medium, degradation due to thermal fluctuation that has been a problem in recent years can be suppressed in this system.

As a perpendicular magnetic recording layer, a CoCr-based alloy magnetic film with an irregular hexagonal crystal structure such as CoCrPt alloy has been mainly studied so far. However, a material with a larger magnetic anisotropy than that of a conventional CoCr-based alloy is desired taking that the thermal fluctuation may be a problem in the perpendicular magnetic recording medium into consideration.

Examples of such a material are ordered alloy materials in which a magnetic element such as Fe or Co and a noble metal element such as Pt or Pd form an ordered phase. It is known, for example, that the ordered alloys of FePt and CoPt with a $L1_0$ crystal structure have large magnetic anisotropy of $7 \times 10^7$ erg/cc and $4 \times 10^7$ erg/cc, respectively, in the c-axis direction (i.e., <001> direction) of the crystal lattice. It is expected that perpendicular magnetic recording media having high thermal fluctuation resistance can be provided by using these materials for a recording layer.

However, since these materials have also higher anisotropy field, saturation field and coercivity as well as higher thermal fluctuation resistance, they require an increased recording field for magnetization reversal in writing. Accordingly, even if a currently available writing head is used, sufficient writing is impossible due to insufficient recording field.

In order to solve the problem, tilted perpendicular recording has been proposed in recent years (see, for example, IEEE Transactions on Magnetics, vol. 38, pp. 3675-3683 (2002)).

Although magnetic crystal grains in the conventional perpendicular magnetic recording medium are oriented such that the easy axis of magnetization directs to the normal line to the film plane, the magnetic crystal grains in the newly proposed magnetic medium are oriented such that the easy axis of magnetization is tilted from the normal line to the film plane. Since such a magnetic recording medium enables recording on a magnetic recording layer comprising magnetic crystal grains having a larger magnetic anisotropy than that of a conventional magnetic layer with a currently available magnetic head, making it possible to significantly improve thermal fluctuation resistance. Accordingly, if such a magnetic recording medium is fabricated using the above-mentioned ordered alloy material having a large magnetic anisotropy, the magnetic recording medium will be excellent in thermal fluctuation resistance as well as in the signal-to-noise ratio (SNR) of read/write (R/W) characteristics and overwrite (OW) characteristics compared with the conventional ones.

When the above-mentioned ordered alloy material is used for the magnetic recording layer of the tilted perpendicular recording medium, crystal grains thereof should be oriented such that the c-axis as the easy axis of magnetization is tilted from the normal line to the film plane. For example, it is conceivable to align the (111) of (110) plane perpendicular to the film plane. Since the c-axis is perpendicular to the (001) plane, the c-axis is expected to be tilted at an angle of about 56° or 45° relative to the normal line to the film plane when a (111) or (110) orientation film is formed. As has been reported in the above document, the recording field may be reduced to a lowest level when the tilt angle is 45°. An example of (110) orientation film epitaxially grown on a single crystal substrate such as MgO (110) has been known to date. However, no other method for forming the (110) orientation film has been reported. Thus, the current method of manufacturing the (110) orientation film that involves the use of a single crystal substrate is not suitable for the HDD medium in view of the cost. On the other hand, a (111) orientation film can easily be manufactured on a glass substrate. However, since the tilt angle of c-axis in the (111) orientation film is rather large as described above, it is said that the film has a similar structure to the longitudinal magnetic recording medium. Consequently, the demagnetizing fields in the vicinity of magnetization transitions in the medium become larger than those of the perpendicular magnetic recording medium, leading to no improvement in SNR.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 12 is a graph showing a relationship between an X-ray diffraction intensity obtained by the pole figure method and a tilt angle φ from the normal line to the medium plane when the tilt angle α of the normal line to the (001) plane of the crystal grains in the magnetic recording layer is 0°;

FIG. 13 is a graph showing a relationship between an X-ray diffraction intensity obtained by the pole figure method and a tilt angle φ from the normal line to the medium plane when the tilt angle α of the normal line to the (001) plane of the crystal grains in the magnetic recording layer is 12°;

FIG. 16 is a graph showing an example of a rocking curve with respect to the (002) plane when the tilt angle α of the normal line to the (001) plane of the crystal grains in the magnetic recording layer is 0°;

FIG. 17 is a graph showing an example of a rocking curve with respect to the (002) plane when the tilt angle α of the normal line to the (001) plane of the crystal grains in the magnetic recording layer is 12°;

FIG. 18 is a graph showing a relationship between a tilt angle α of the normal line to the (001) plane of the crystal grains in the magnetic recording layer and SNR;

FIG. 19 is a graph showing a relationship between a tilt angle α of the normal line to the (001) plane of the crystal grains in the magnetic recording layer and OW characteristics;

FIG. 22 is a graph showing a relationship between a Cr content of the Cr—Ru alloy (second underlayer) and SNR as well as a tilt angle α of the normal line to the (001) plane of the crystal grains in the magnetic recording layer;

FIG. 23 is a cross-sectional view showing the perpendicular magnetic recording medium in Example 3;

FIG. 24 is a graph showing a relationship between a tilt angle β of the normal line to the (200) plane of the crystal grains in Pt (third underlayer) and SNR as well as a tilt angle α of the normal line to the (001) plane of the crystal grains in the magnetic recording layer; and FIG. 25 is a graph showing a relationship between the ratio $O_{12}/O_{23}$ of an oxygen amount at the interface between Ni—Ta (first underlayer) and Cr (second underlayer) to an oxygen amount at the interface between Cr (second underlayer) and Pt (third underlayer) and SNR as well as a tilt angle α of the normal line to the (001) plane of the crystal grains in the magnetic recording layer.

DETAILED DESCRIPTION

Various embodiments according to the invention will be described hereinafter with reference to the accompanying drawings. In general, according to one embodiment of the present invention, there is provided a magnetic recording medium comprising: a substrate; a first underlayer formed on the substrate and comprising an amorphous alloy containing Ni; a crystalline second underlayer formed on the first underlayer and comprising simple Cr or an alloy containing Cr; and a magnetic recording layer formed on the second underlayer and comprising at least one element of Fe and Co and at least one element of Pt and Pd, and containing magnetic crystal grains having an $L1_0$ structure, wherein an oxygen amount remaining on an upper surface of the second underlayer is larger than an oxygen amount remaining on a lower surface of the second underlayer, and wherein a normal line to a (001) plane of the magnetic crystal grains in the magnetic recording layer is oriented with a tilt angle in a range of 3 to 25° to a normal line to a medium plane.

According to another embodiment of the present invention, there is provided a method of manufacturing a magnetic recording medium comprising: depositing a first underlayer comprising an amorphous alloy containing Ni on a substrate; heating the substrate to a temperature in a range of 25 to 280° C., followed by allowing oxygen to be adsorbed on a surface of the first underlayer; depositing a crystalline second underlayer comprising simple Cr or an alloy containing Cr on the first underlayer having adsorbed oxygen; and depositing a magnetic recording layer on the second underlayer, the magnetic recording layer comprising at least one element of Fe and Co and at least one element of Pt and Pd and containing magnetic crystal grains having an $L1_0$ structure.

Figure 1:
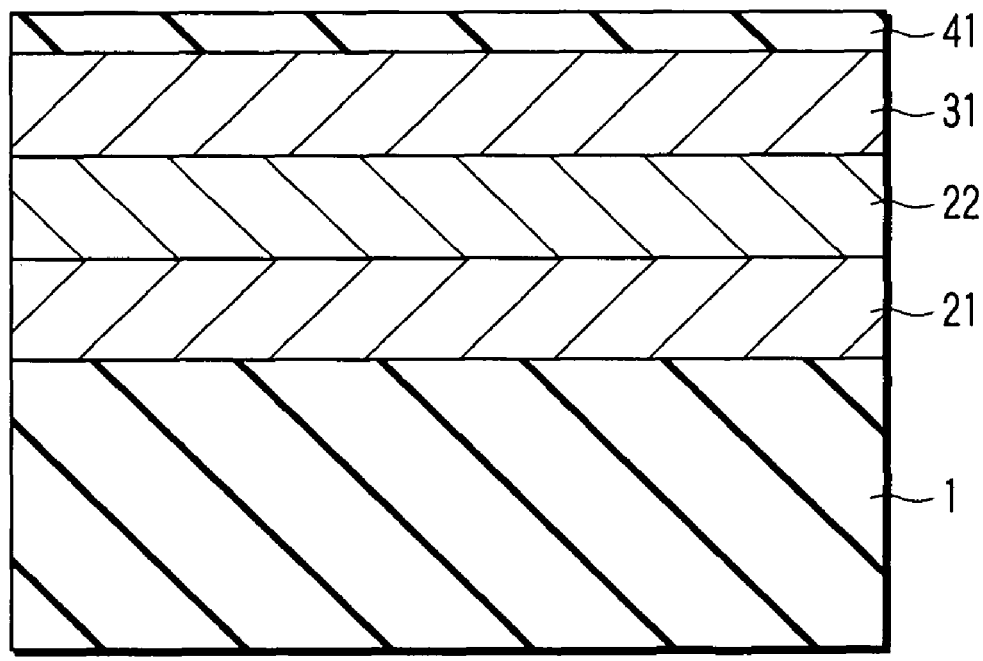
FIG. 1 is a cross-sectional view showing a perpendicular magnetic recording medium according to an embodiment of the present invention.

FIG. 1 shows a cross-sectional view of a magnetic recording medium according to an embodiment of the present invention. The magnetic recording medium has a structure comprising a first underlayer 21, a second underlayer 22, a magnetic recording layer 31 and a protective layer 41 stacked on a substrate 1 in this order.

Each layer of the magnetic recording medium of the present invention shown in FIG. 1 will be described in detail.

Examples of the non-magnetic substrate 1 include, for example, a glass substrate, an Al-based alloy substrate, a Si single crystal substrate having an oxide on the surface thereof, a ceramic substrate and a plastic substrate. These nonmagnetic substrates may have a plated metal such as a NiP alloy on the surface thereof.

The first underlayer 21 and second underlayer 22 are provided for improving the function of the magnetic recording layer 31.

The first underlayer 21 comprises an amorphous alloy containing Ni. The term "amorphous" as used herein does not always mean perfectly amorphous substance such as a glass, but may include a substance in which fine crystals with a size of 2 nm or less are randomly oriented. Examples of the preferable amorphous alloy containing Ni include Ni—Nb, Ni—Ta, Ni—Zr, Ni—W, Ni—Mo, Ni—Hf and Ni—V. The Ni content of these alloys is preferably in the range of 20 to 70 at %. The alloy hardly becomes amorphous if the Ni content is less than 20 at % or exceeds 70 at %. The Ni content is preferably in the range of 30 to 50 at %, and the alloy having the Ni content in this range tends to further improve SNR.

The second underlayer 22 comprises simple Cr or an alloy containing Cr, and is crystalline. Examples of the Cr alloy are Cr—Ti and Cr—Ru. The Cr content is preferably 60 at % or more, more preferably in the range of 60 to 95 at %, and further preferably in the range of 70 to 85 at %. SNR tends to be further improved when the Cr content is in the above-mentioned range. In contrast, SNR decreases when the Cr content is less than 60 at % because the layer tends to be a (111) orientation film.

The magnetic recording layer 31 comprises at least one element of Fe and Co and at least one element of Pt and Pd, and contains magnetic crystal grains having an $L1_0$ structure.

With respect to the preferable composition of the magnetic metal element and the noble metal element in the perpendicular magnetic recording layer, the Pt content is preferably in the range of 32 to 65 at % for a Fe—Pt binary alloy, the Pd content is preferably in the range of 40 to 63 at % for a Fe—Pd binary alloy, and the Pt content is preferably in the range form 40 to 70 at % for a Co—Pt binary alloy. An $L1_0$ ordered phase may be formed when the composition of each alloy is in the above range.

Elements such as Cu, Zn, Zr and C, and compounds such as MgO and $SiO_2$ may be added in an appropriate amount in the perpendicular magnetic recording layer for the purpose of improving magnetic characteristics or electromagnetic transducing characteristics. Addition of Cu is particularly preferable for enhancing ordering of the ordered alloy.

Although the thickness of the perpendicular magnetic recording layer is determined depending on the requirement for the magnetic recording system, it is preferably in the range of 0.5 to 50 nm, more preferably 0.5 to 20 nm. The magnetic recording layer hardly forms a continuous layer when the thickness is smaller than 0.5 nm.

A multilayer film comprising two or more stacked magnetic layers having different characteristics may be used as the magnetic recording layer. At least one non-magnetic layer may be provided as an intermediate layer in the magnetic layer comprising two or more magnetic layers. Exchange coupling interaction and/or magnetostatic coupling interaction can act on the stacked magnetic layers in this case. The structure of the magnetic recording layer may be appropriately selected depending on the magnetic characteristics required in the magnetic recording system or manufacturing process.

The perpendicular magnetic recording medium having the above-described magnetic recording layer has good read/write characteristics with good SNR, OW characteristics and thermal stability, and enables high-density recording.

Examples of the material of the protective layer 41 include C, diamond-like carbon (DLC), $SiN_x$, $SiO_x$ and $CN_x$. A lubricating layer (not shown) may be formed on the protective layer 41.

Figure 2:
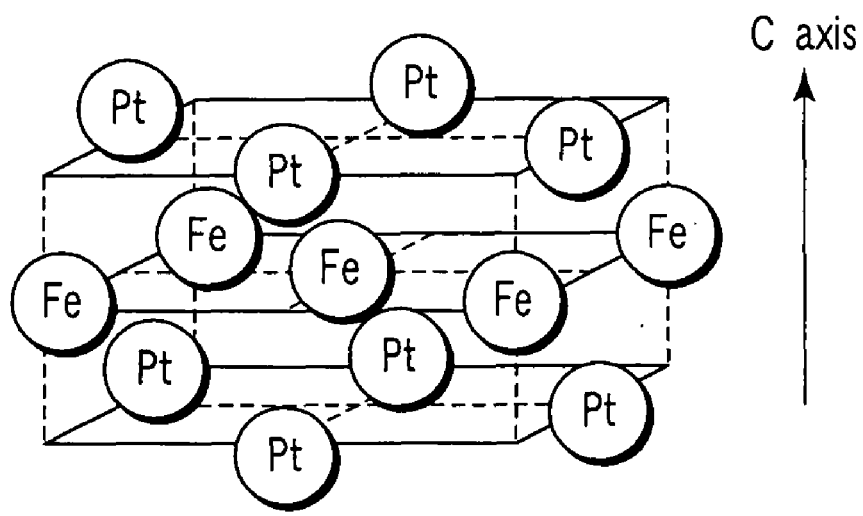
FIG. 2 illustrates a magnetic recording layer having an $L1_0$ structure.

FIG. 2 shows the $L1_0$ structure of the magnetic crystal grains in the magnetic recording layer 31 used in the present invention. As shown in the drawing, the $L1_0$ structure refers to a crystal structure in which heteroatoms such as Fe and Pt are alternately and regularly disposed (ordered phase) on a plane perpendicular to a crystal axis (for example c-axis) on crystal lattice points of a face centered tetragonal lattice. In contrast, a disordered phase having no regular structure forms a face centered cubic lattice, and each atom is randomly located at lattice points.

Whether the crystal grains constituting the magnetic recording layer 31 has the $L1_0$ structure or not can be confirmed using a conventional X-ray diffraction apparatus. If peaks (ordered lattice reflections) assigned to planes such as (001), (110) and (003), which are not observed in the disordered face centered cubic lattice, are observed at diffraction angles corresponding to respective plane spacing, the presence of the $L1_0$ structure can be confirmed.

When the magnetic particles are as small as about 5 nm and coherency of the crystal lattices between adjoining particles are small, an amorphous phase may be observed in X-ray diffraction. Since these planes are tilted to the medium plane, the intensities of these peaks are so lowered in a common $\theta$-$2\theta$ method that these peaks may hardly be observed. However, these peaks can be observed by in-plane X-ray diffraction (in-plane XRD). Otherwise, the $L1_0$ structure can be confirmed through observation of fine structures using a transmission electron microscope (TEM).

Figure 3:
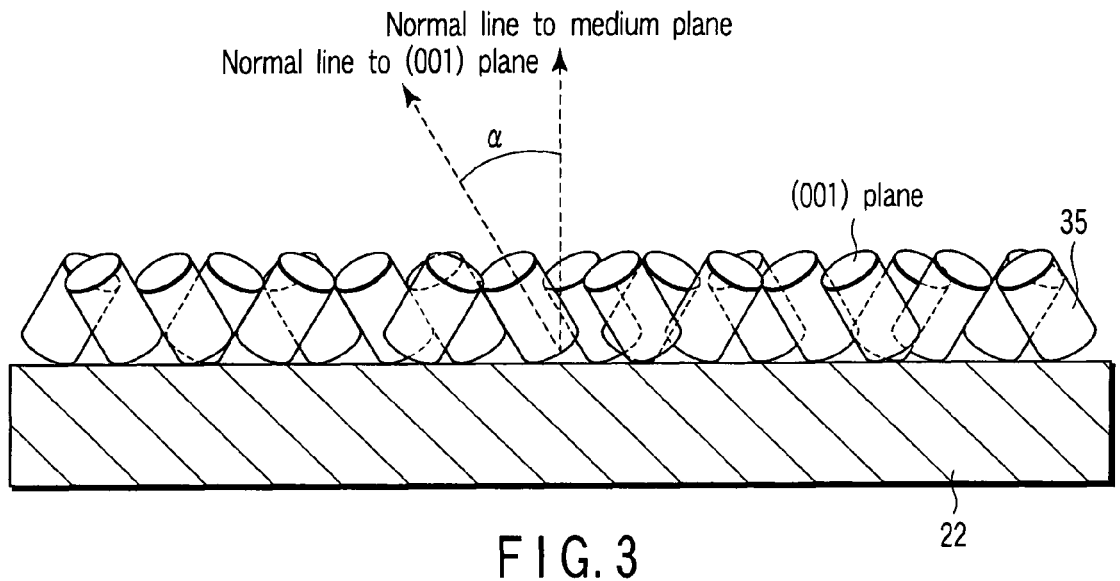
FIG. 3 illustrates the orientation of the (001) plane of crystal grains in a magnetic recording layer.

FIG. 3 schematically illustrates a cross-sectional structure of the crystal grains the normal line to the (001) plane of which is oriented in a tilted direction to the normal line to the medium plane. Each crystal grain is represented by a circular cylinder in the drawing.

As shown in the drawing, the c-axis of each crystal grain is tilted to the normal line to the medium plane, where the tilt angle is represented by $\alpha$. The tilt angle as used herein refers to a solid angle formed between the normal line to a plane (which is parallel to the c-axis in the case of (001) plane) and the normal line to the medium plane. Since the easy axis of magnetization of the magnetic grains having the $L1_0$ structure is parallel to the c-axis, the easy axis is also tilted from the normal line to the medium plane when the crystal grains are formed in tilted as described above. Accordingly, the aforementioned perpendicular magnetic recording medium having a tilted easy axis of magnetization can be formed.

The orientation direction of the normal line to the (001) plane (c-axis in this case) used herein refers to a direction in which the normal lines to the (001) plane (c-axis in this case) of most of the crystal grains are oriented.

The (001) plane of each magnetic crystal grain of the magnetic recording layer in the magnetic recording medium according to embodiments of the present invention is oriented with a tilt angle $\alpha$ in the range of 3 to 25°. Each tilt angle $\alpha$ is not largely distributed in this range, and exhibits a value converged around an angle within the afore-mentioned range. The tilt angle $\alpha$ is not a plane angle, but a solid angle. Accordingly, the (001) plane of each crystal grain in the magnetic recording layer may be randomly distributed with a solid angle $\alpha$ to a plane parallel to the medium plane, or may be anisotropic in one direction.

The more preferable tilt angle of the normal line to the (001) plane of the magnetic particle in the magnetic recording layer is in the range of 5 to 15°. Both SNR and OW characteristics are remarkably improved when the tilt angle is in the above-mentioned range. However, if the tilt angle is less than 3°, OW characteristics are degraded due to increase of required recording field. On the other hand, if the tilt angle is larger than 25°, SNR characteristics tend to be degraded due to degradation of the signal intensity.

A method for measuring the tilt angle of the normal line to the (001) plane in the magnetic recording layer will be described below. The direction in which the normal line to a crystal plane is tilted can be evaluated based on a so-called pole figure using an X-ray diffraction apparatus, for example (see B. D. Cullity and S. R. Stock, Element of X-ray Diffraction, 3rd edition, pp. 402-433).

A method for measuring the pole figure will be described with reference to FIG. 4. As illustrated in the drawing, the angles θ and 2θ are fixed at a diffraction angle (Bragg angle) of a crystal plane to be evaluated, and diffracted X-ray is measured while changing an azimuthal angle φ in the medium plane and a tilt angle φ from the normal line to the medium plane. Provided that the plane to be evaluated is (hkl) plane, then the fixed angle is not necessarily a diffraction angle of the (hkl) plane, and it may be a diffraction angle of a plane parallel to the (hkl) plane such as (2h2k2l). For example, a diffraction angle corresponding to the reflection from the (002) plane may be measured in place of the (001) plane of the crystal grain of the above-mentioned $L1_0$ structure. How the crystal planes are three-dimensionally distributed can be evaluated from the changes of the diffraction intensities obtained for φ and φ. For example, when the normal line to a plane to be evaluated is parallel to the normal line to the medium plane, the diffraction intensity is in maximum when φ is 0°. When the normal line to the plane to be evaluated is tilted to the normal line to the medium plane, the diffraction intensity is in maximum when φ is an angle corresponding to the inclination to the normal line to the medium plane to be evaluated. When the distribution in the direction of the tilt angle φ is to be more quantitatively evaluated, the X-ray intensities obtained with respect to the same φ are integrated with respect to φ, and the value of φ giving the highest intensity can be obtained by plotting the integrated intensities for φ.

When the normal line to the crystal plane is oriented in the direction tilted to the normal line to the medium plane as described above, a characteristic curve is obtained by measuring a so-called rocking curve using the XRD apparatus. The rocking curve is measured by setting φ and φ in FIG. 4 to zero, fixing 2θ to twice of the Bragg angle θ of the crystal plane to be evaluated, and scanning the angle ω (θ in FIG. 4). When the normal line to the crystal plane is in the direction of the normal line to the medium plane, a maximum peak is obtained at a point in the vicinity of the point where ω equals θ. In contrast, two maximum peaks are obtained at angles ω that are toward a slightly higher angle and a lower angle with respect to θ, respectively, when the normal line to the crystal plane is tilted from the normal line to the medium plane. On the other hand, when the normal line is oriented in the direction of the normal line to the medium plane but orientation dispersion thereof is large, or when the degree of orientation is merely low, although the peak is in maximum in the vicinity of the point where ω equals θ, the full with at half maximum of the peak tends to be increased. Accordingly, the state in which the normal lines to the crystal plane are oriented with a tilt angle is different from the sate in which the degree of orientation is merely low.

A method of manufacturing the magnetic recording medium shown in FIG. 1 according to the embodiment of the present invention will be described below. First, the first underlayer 21 is deposited on the substrate 1. Then, the substrate 1 is heated and oxygen is allowed to be adsorbed on the surface of the first underlayer 21. After allowing oxygen to be adsorbed on the first underlayer 21, the second underlayer 22 is deposited on the first underlayer 21. The magnetic recording layer 31 is deposited on the second underlayer 22. Then, the protective layer 41 is deposited on the magnetic recording layer 31 to manufacture the magnetic recording medium of the present invention.

For forming the underlayer and magnetic recording layer in the present invention, vacuum evaporation, sputtering, chemical vapor deposition and laser ablation may be used. Favorably used sputtering methods include single-target sputtering using a composite target and multi-target sputtering using plural targets of various elements. Ordering of the magnetic recording layer may be readily advanced by heating the substrate at a temperature in the range of 200 to 500° C. before and during deposition of the magnetic recording layer.

The substrate temperature 1 for allowing oxygen to be adsorbed on the surface of the first underlayer 21 is in the range of 25 to 280° C. The temperature is controlled by changing the heating time. The oxygen adsorption method comprises the steps of introducing a minute amount of oxygen into the deposition chamber, and exposing the surface of the resultant underlayer to the atmosphere containing oxygen for a short period of time. Other methods available include exposing the substrate to ozone, or irradiating the surface of the first underlayer with oxygen radicals or oxygen ions. The oxygen amount adsorbed on the surface of the underlayer comprising an amorphous alloy comprising Ni may be varied by adjusting the substrate temperature before and/or during oxygen exposure.

Since oxygen adsorbed on the surface of the first underlayer 21 is diffused into the upper layers during the process of manufacturing the medium, the oxygen is not localized at the interface between the first underlayer 21 and second underlayer 22 and is also distributed at the interface between the second underlayer 22 and an upper layer. It has been found that, when the surface of the first underlayer 21 is exposed with a proper amount of oxygen and the oxygen amount on the upper surface of the second underlayer 22 is larger than that on the lower surface of the second underlayer 22, the normal line to the (001) plane of the magnetic crystal grains in the magnetic recording layer 31 is oriented in a direction tilted from the normal line to the medium plane to result in an improvement of magnetic characteristics.

The above effects found by the present inventors are quite new ones that have not been obtained by the conventional method of manufacturing the medium. The present inventors have deduced the mechanism of the effects that above-described orientation of the magnetic recording layer could be obtained because the interface energy between the first underlayer comprising the amorphous alloy containing Ni and the second underlayer containing Cr or Cr alloy on the first underlayer is varied by the effect of a minute amount of adsorbed oxygen atoms (or oxygen molecules) that causes a slight change in the crystal structure or orientation of Cr or Cr alloy. However, the mechanism is not clear at present.

On the other hand, when the amount of adsorption of oxygen on the surface of the first underlayer 21 is larger than a proper amount, the amount of adsorbed oxygen that cannot diffuse increases and the oxygen amount remaining at the interface of the first underlayer and second underlayer tends to be increased. When the oxygen amount on the upper surface of the second underlayer 22 is smaller than the that on the lower surface of the second underlayer 22, a so-called (001) orientation film is formed, in which the normal line to the (001) plane of the magnetic crystal grain of the magnetic recording layer is oriented parallel to the normal line to the medium plane. Consequently, SNR characteristics are lowered since the crystal grains do not show above-mentioned tilted orientation. Crystallinity of the magnetic recording layer is lowered when the adsorbed oxygen amount on the surface of the first underlayer 21 is further increased so as to adversely affect magnetic characteristics and R/W characteristics.

The oxygen amount in the medium can be evaluated by secondary ion mass spectroscopy (SIMS), X-ray photoelectron spectroscopy (XPS) or Auger electron spectroscopy (AES).

The magnetic recording medium according to embodiments of the present invention is not limited to that shown in FIG. 1. Examples of several modifications of the magnetic recording medium according to the embodiments of the present invention will be described below, but it may be apparent to those skilled in the art that the present invention is not limited to these examples.

Figure 5:
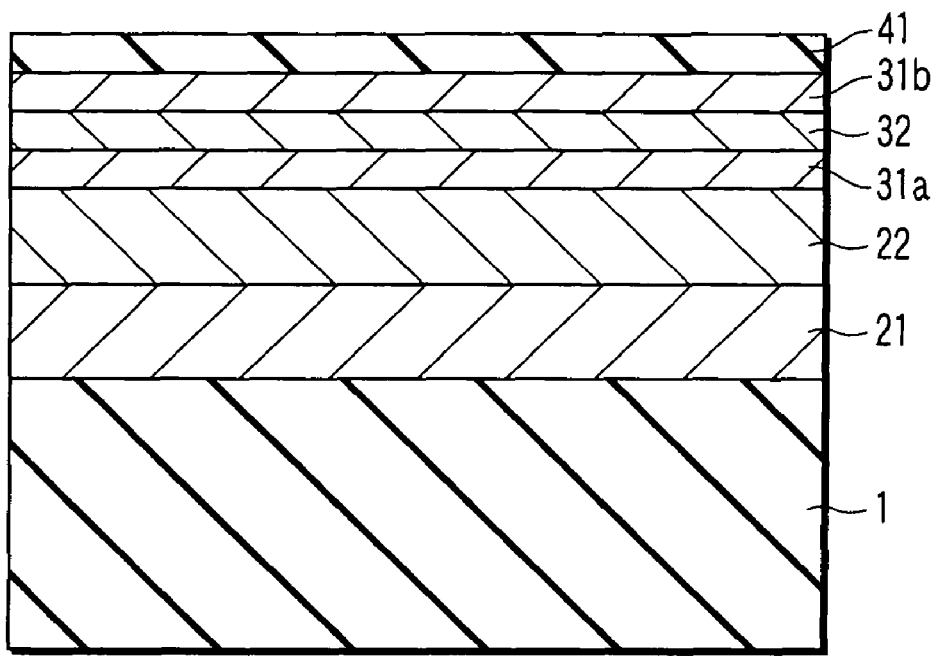
FIG. 5 is a cross-sectional view showing a perpendicular magnetic recording medium according to another embodiment of the present invention.

FIG. 5 shows a cross-sectional view of a magnetic recording medium according to another embodiment of the present invention. The magnetic recording medium has a similar structure to that of the perpendicular magnetic recording medium shown in FIG. 1, except that the magnetic recording layer is a multilayer comprising a first magnetic layer 31a and a second magnetic layer 32b formed on the first magnetic layer with a non-magnetic layer 32 interposed.

Figure 6:
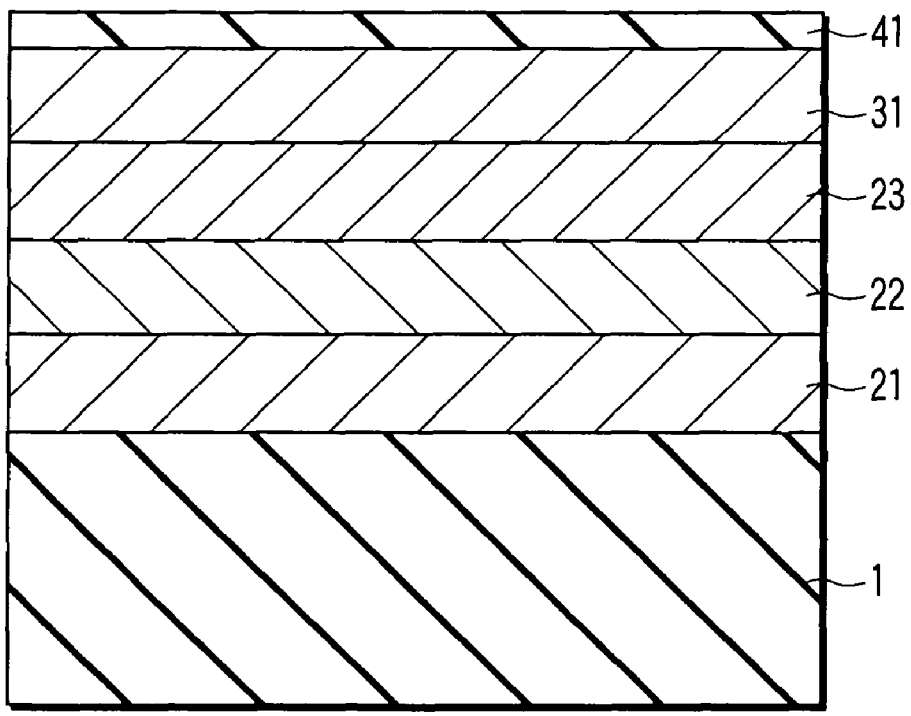
FIG. 6 is a cross-sectional view showing a perpendicular magnetic recording medium according to another embodiment of the present invention.

FIG. 6 shows a cross-sectional view of a magnetic recording medium according to another embodiment of the present invention. The magnetic recording medium has a similar structure to that of the magnetic recording medium shown in FIG. 1, except that a third crystalline underlayer 23 comprising at least one element selected from the group consisting of Pt, Pd, Ag, Cu and Ir or an alloy thereof is further provided between the second underlayer 22 and magnetic recording layer 31. The crystal grain of the crystalline third underlayer 23 has preferably a normal line to the (100) plane tilted in the direction in an angle ranging from 3 to 25° to the normal line to the medium plane. The crystal grains of the magnetic recording layer can epitaxially grow easily following the orientation direction to orient as described above, and orientation dispersion of the (001) plane of the crystal grains in the magnetic recording layer is further reduced, making it possible to provide good SNR.

Figure 7:
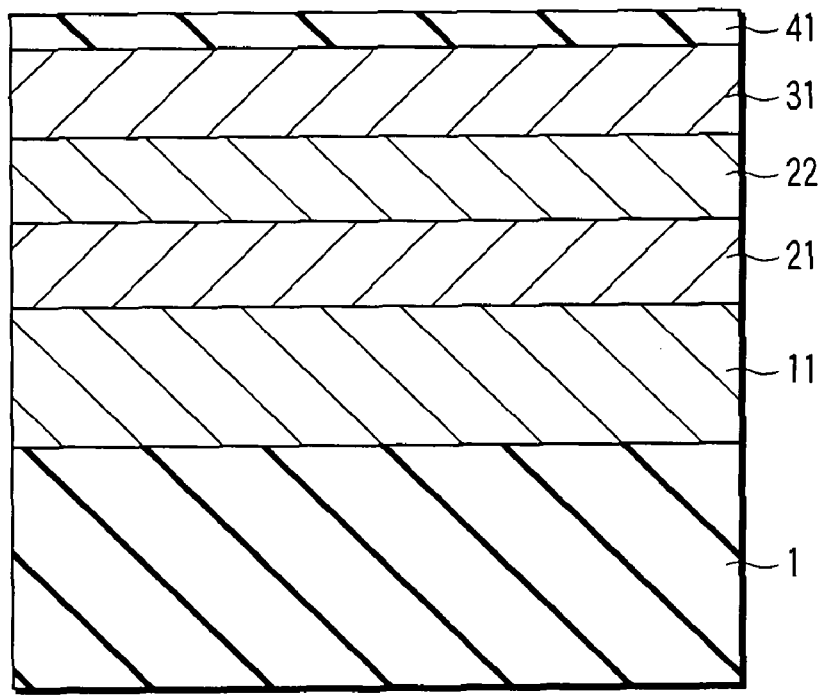
FIG. 7 is a cross-sectional view showing a perpendicular magnetic recording medium according to another embodiment of the present invention.

FIG. 7 shows a cross-sectional view of a magnetic recording medium according to another embodiment of the present invention. This magnetic recording layer has a similar structure to that of the magnetic recording medium shown in FIG. 1, except that a soft underlayer 11 is provided between the substrate 1 and first underlayer 21. This magnetic recording medium is a so-called perpendicular double-layer medium. The soft underlayer having high permeability shares a part of the function of the magnetic head for horizontally passing a recording field from a magnetic head having a single pole or shielded magnetic pole for magnetizing the perpendicular magnetic recording layer and refluxing it to the magnetic head side. This permits a steep and sufficient perpendicular magnetic field to be applied to the magnetic recording layer so as to serve for improving read/write efficiency. Examples of the materials for such soft underlayer include CoZrNb, FeSiAl, FeTaC, CoTaC, NiFe, Fe, FeCoB, FeCoN and FeTaN. The soft underlayer may be a multilayer film comprising at least two layers of different materials or compositions.

Figure 8:
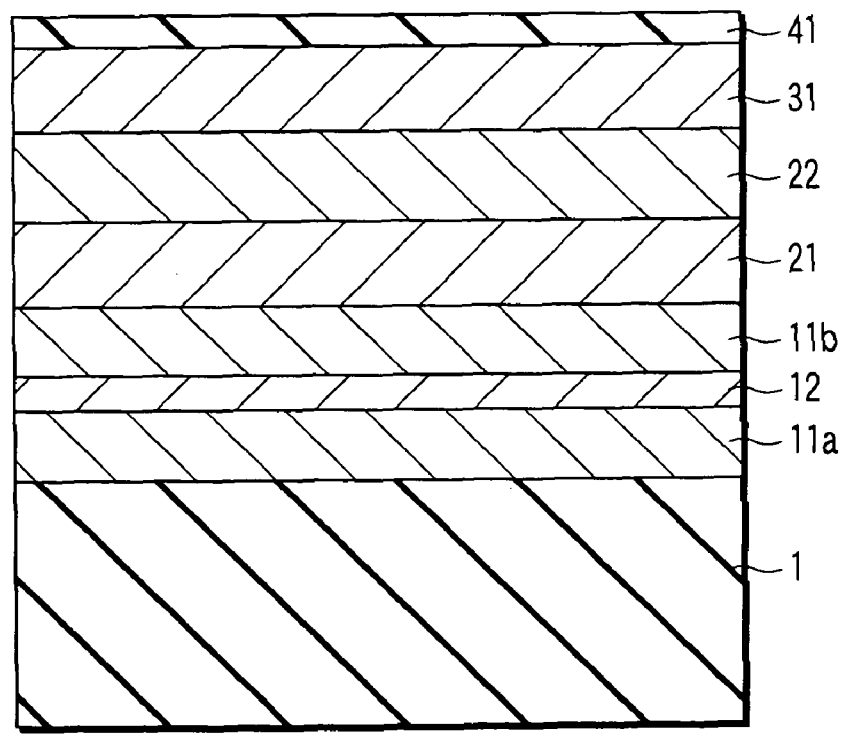
FIG. 8 is a cross-sectional view showing a perpendicular magnetic recording medium according to another embodiment of the present invention.

FIG. 8 shows a cross-sectional view of a magnetic recording medium according to another embodiment of the present invention. The magnetic recording medium has a similar structure to that of the magnetic recording medium shown in FIG. 7, except that the soft underlayer is a multilayer film comprising, for example, a first soft magnetic layer 11a and a second soft magnetic layer 11b formed on the first soft magnetic layer with a Ru thin film 12 interposed.

Figure 9:
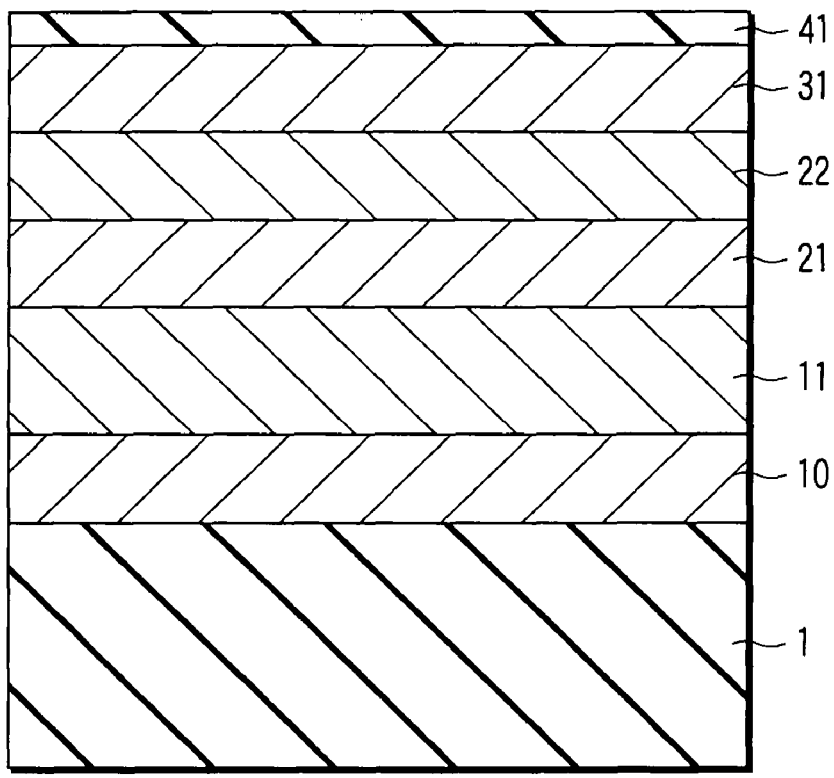
FIG. 9 is a cross-sectional view showing a perpendicular magnetic recording medium according to another embodiment of the present invention.

FIG. 9 shows a cross-sectional view of a magnetic recording medium according to another embodiment of the present invention. The magnetic recording medium has a similar structure to that of the magnetic recording medium shown in FIG. 7, except that a biasing layer 10 is further provided between the substrate 1 and soft underlayer 11. The soft underlayer readily forms magnetic domains, which may generate spike noise. Therefore, domain walls are prevented from being formed by applying a bias field to the soft underlayer formed on the biasing layer to which a magnetic field is applied in a radial direction. The biasing layer may have either a single layer structure or a stacked structure of two or more layers. The stacked structure hardly forms large magnetic domains.

Examples of the material for the biasing layer include an in-plane hard magnetic film or an antiferromagnetic film, for example CoCrPt, CoCrPtB, CoCrPtTa, CoCrPtTaNd, CoSm, CoPt, CoPtO, CoPtCrO, CoPt—$SiO_2$, CoCrPt—$SiO_2$, CoCrPtO—$SiO_2$, IrMn, PtMn and FeMn.

Figure 10:
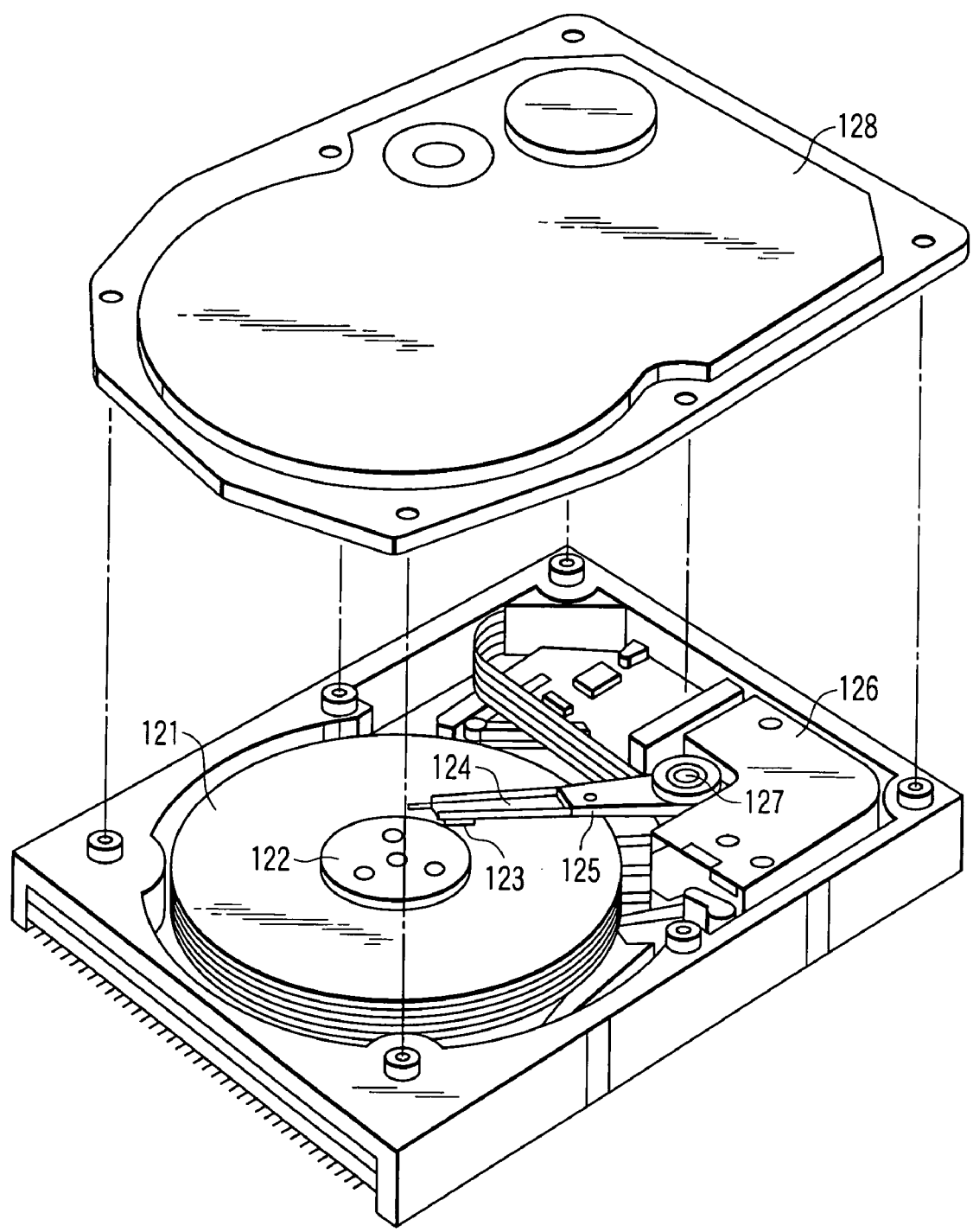
FIG. 10 is a perspective view showing a magnetic recording apparatus according to an embodiment of the present invention.

FIG. 10 shows a perspective view of the magnetic recording apparatus according to an embodiment of the present invention. A magnetic disk 121 is mounted on a spindle 122, and is made to rotate by a spindle motor. A slider 123 incorporating a write head for writing information to the magnetic disk 21 and an MR head for reading information from the magnetic disk 21 is provided at the tip of a suspension 124. The write pole of the write head is not limited to the single pole, and a shielded pole may be used. The suspension 124 is attached to an end of an actuator arm 125 having a bobbin portion for holding a driving coil (not shown). A voice coil motor 126, a type of a linear motor, is provided at the other end of the actuator arm 125. The voice coil motor 126 is composed of a magnetic circuit including a driving coil (not shown) wound around the bobbin portion of the actuator arm 125 and a permanent magnet and a counter disposed so as to sandwich the driving coil. The actuator arm 125 is supported by ball bearings (not shown) provided at upper and lower portions of a pivot 127, and is pivotally rotated with the voice coil motor 126. Thus, the slider 123 on the magnetic disk 121 is position-controlled with the voice coil motor 126. The reference numeral 128 in the drawing shows a cover.

EXAMPLES

The present invention will be described in more detail based on examples.

Example 1

Figure 11:
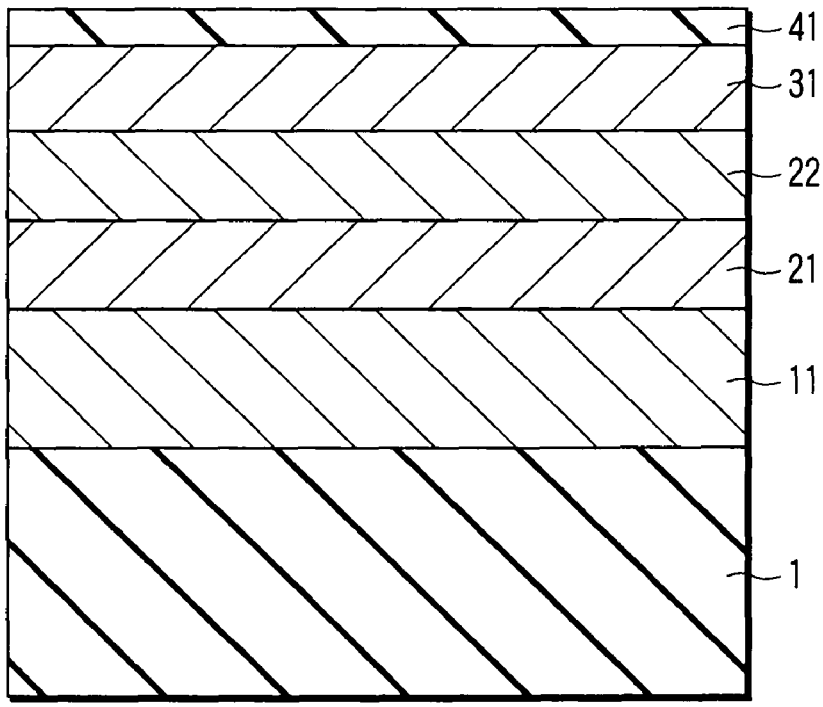
FIG. 11 is a cross-sectional view showing a perpendicular magnetic recording medium in Example 1 of the present invention.

The magnetic recording medium shown in FIG. 11 was manufactured in this example. The magnetic recording medium shown in FIG. 11 has a structure comprising a soft underlayer 11, a first underlayer 21, a second underlayer 22, a magnetic recording layer 31 and a protective layer 41 stacked on a substrate 1. Various materials were used for the first underlayer 21 in this example. In addition, the substrate temperature and oxygen partial pressure were variously changed for allowing oxygen to be adsorbed on the first underlayer.

The substrate 1 prepared was a glass substrate (trade name TS-10SX, manufactured by OHARA INC.) for a hard disk with a diameter of 2.5 inches. The sputtering apparatus used was C-3010 (trade name, manufactured by Anelva corporation). This apparatus is equipped with a plurality of vacuum chambers, and films are deposited by sequentially transferring the substrate to each vacuum chamber. A Co-5 at % Zr-5 at % Nb target for the soft underlayer 11 was set in the first chamber, an Ni target and a Ta target for the first underlayer was set in the second chamber, a Cr target for the second underlayer was set in the third chamber, a Fe-47 at % Pt target for the magnetic recording layer was set in the fourth chamber, and a C target for the protective layer was set in the fifth chamber. The substrate was loaded to the sputtering apparatus, and each chamber was evacuated to $1 \times 10^{-6}$ Pa or less.

A Co-5 at % Zr-5 at % Nb film (soft underlayer) was deposited on the substrate at a thickness of 100 nm by DC sputtering with a power of 700 W under an Ar atmosphere at a pressure of 0.7 Pa in the first chamber.

A Ni—Ta film (first underlayer) with a thickness of 7 nm was deposited in the second chamber under an Ar atmosphere at a pressure of 0.7 Pa by co-sputtering with controlling the power applied to the Ni target and Ta target. After heating the substrate with an IR lamp heater, oxygen was introduced into the second chamber to expose the surface of the first underlayer to oxygen for 5 seconds.

The Ta contents in the Ni—Ta layer were changed to 0, 10, 20, 30, 40, 50, 60, 70, 80, 90 and 100% by changing the power applied to the Ni target and Ta target.

The substrate temperature was changed in the range of 25 to 300° C. by changing the heating time. The oxygen partial pressure was changed in the range of $4.5 \times 10^{-6}$ Pa to $4.5 \times 10^{-2}$ Pa by changing the flow rate of oxygen. The amount of oxygen exposure is expressed by a product of the oxygen pressure and oxygen exposure time under a unit L (Langmuir unit) defined as $1 L=1.32 \times 10^{-4}$ Pa·second. For example, the amount of oxygen exposure is 17 L when the oxygen partial pressure is $4.5 \times 10^{-4}$ Pa and the oxygen exposure time is 5 seconds.

A Cr film (second underlayer) with a thickness of 7 nm was deposited by DC sputtering with a power of 700 W in an Ar gas atmosphere of 0.7 Pa in the third chamber.

The fourth chamber was made an Ar gas atmosphere of 10 Pa. The substrate was heated to 320° C. with an IR lamp heater. A Fe-47 at % Pt film (magnetic recording layer) was deposited at a thickness of 10 nm by DC sputtering with a power of 700 W.

A C film (protective layer) with a thickness of 5 nm was deposited by DC sputtering in the fifth chamber with a power of 700 W in Ar atmosphere at a pressure of 0.7 Pa.

The substrate was taken out of the sputtering apparatus, and perfluoropolyether (PFPE) as a lubricant was applied to the surface of the protective layer at a thickness of 13 Å by dipping to manufacture a magnetic recording medium.

Magnetic recording media having a first underlayer of Ni—Nb, Ni—Zr, Ni—W, Ni—V, Ni—Mo or Ni—Hf instead of Ni—Ta were manufactured by the same method as described above.

Methods for evaluating the magnetic recording media manufactured in this example will be described hereinafter.

R/W characteristics were evaluated with a spin stand. A magnetic head comprising a single pole head with a write track width of 0.3 μm and an MR head with a read track width of 0.2 μm was for measuring the R/W characteristics. The characteristics were measured at a fixed position at a radius of 20 mm under a rotation speed of 4,200 rpm.

A signal-to-noise ratio (SNRm) was determined based on a reproduced wave which has passed through a differentiator. Here, S denotes an output at a linear recording density of 119 kfci and Nm denotes an rms (root mean square) value at a linear density of 716 kfci.

OW characteristics were evaluated based on a reproduced output ratio (attenuation factor) of signals written at 119 kfci before and after overwriting signals at 250 kfci on the signals written at 119 kfci.

Thermal fluctuation resistance was evaluated based on a reproduced output ratio $V_{1000}/V_0$ of signals written at 100 kfci, where $V_0$ denotes the reproduced output immediately after writing the signals and $V_{1000}$ denotes the reproduced output after the medium is left stand for 1000 seconds in an environment at 70° C.

The crystal structure and orientation of the crystal plane were evaluated by the θ-2θ method, rocking curve method and pole figure method using an X-ray diffraction apparatus X'pert-MRD (trade name, manufactured by Philips) with generating a Cu—Kα ray under a condition of an accelerating voltage of 45 kV and a filament current of 40 mA.

Figure 4:
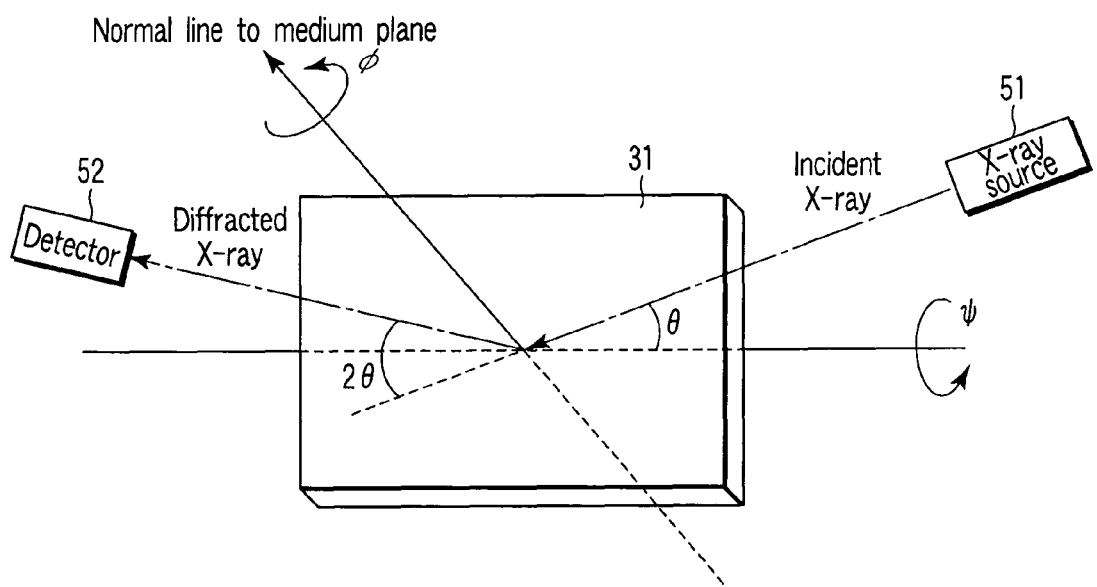
FIG. 4 illustrates a method for measuring a pole figure.

Orientation of the crystal plane was evaluated by the pole figure method using the distribution of X-ray diffraction intensity of the (002) plane of each medium, where θ and 2θ in FIG. 4 were fixed at 24.25° and 48.5° corresponding to Bragg angles of reflection from the (002) plane of FePt layer, respectively, and the X-ray diffraction intensity was measured by changing the tilt angle φ in the range of 0 to 85° and the in-plane rotation angle φ in the range of 0 to 360°. The X-ray diffraction intensity obtained at the same angle φ was integrated with respect to φ, the integrated intensity was plotted against φ, and the angle φ having the highest intensity was defined as a tilt angle α of the normal line to the (002) plane of the FePt layer from the normal line to the medium plane.

FIG. 12 shows the relationship between the X-ray diffraction intensity integrated with respect to φ and φ of the medium having α of 0°. FIG. 13 shows the relationship between the X-ray diffraction intensity integrated with respect to φ and φ of the medium having α of 12°. As shown in FIG. 12, the intensity becomes maximum at φ=0 with α of 0°, i.e., when the normal line to the (001) plane coincides with the normal line to the medium plane. In contrast, when α is not 0° and the normal line to the (001) plane is tilted from the normal line to the medium plane, the intensity becomes maximum at an angle where φ is not zero as shown in FIG. 13.

It was found from the evaluation by the pole figure method with the XRD apparatus that the tilt angle α of the (002) plane of the FePt layer changes in the range of 0 to 30° by changing the oxygen partial pressure in oxygen exposure and the substrate temperature.

Figure 14:
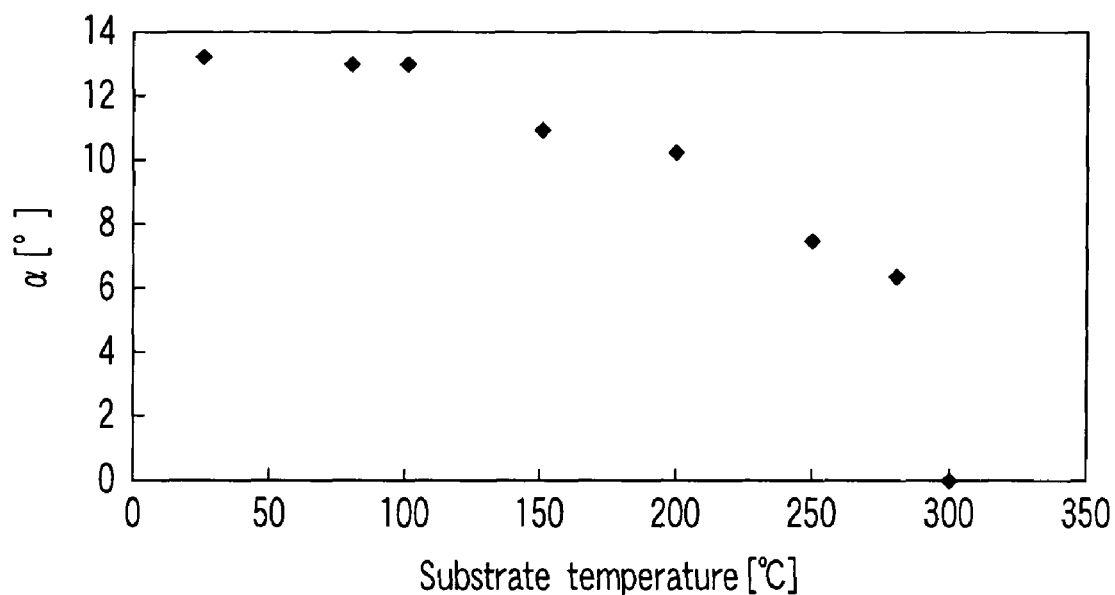
FIG. 14 is a graph showing a relationship between a substrate temperature after deposition of the first underlayer and a tilt angle α of the normal line to the (001) plane of the crystal grains in the magnetic recording layer.

FIG. 14 shows the relationship between the substrate temperature after forming the first underlayer and the tilt angle α of the normal line to the (002) plane of the FePt layer when the first underlayer is made of Ni-40 at % Ta and the amount of oxygen exposure is 17 L. As shown in FIG. 14, a becomes 0° when the substrate temperature exceeds 280° C. The same tendency was observed in the medium using Ni-40 at % Nb, Ni-40 at % Zr, Ni-40 at % W, Ni-40 at % V, Ni-40 at % Mo or Ni-40 at % Hf as the first underlayer.

Figure 15:
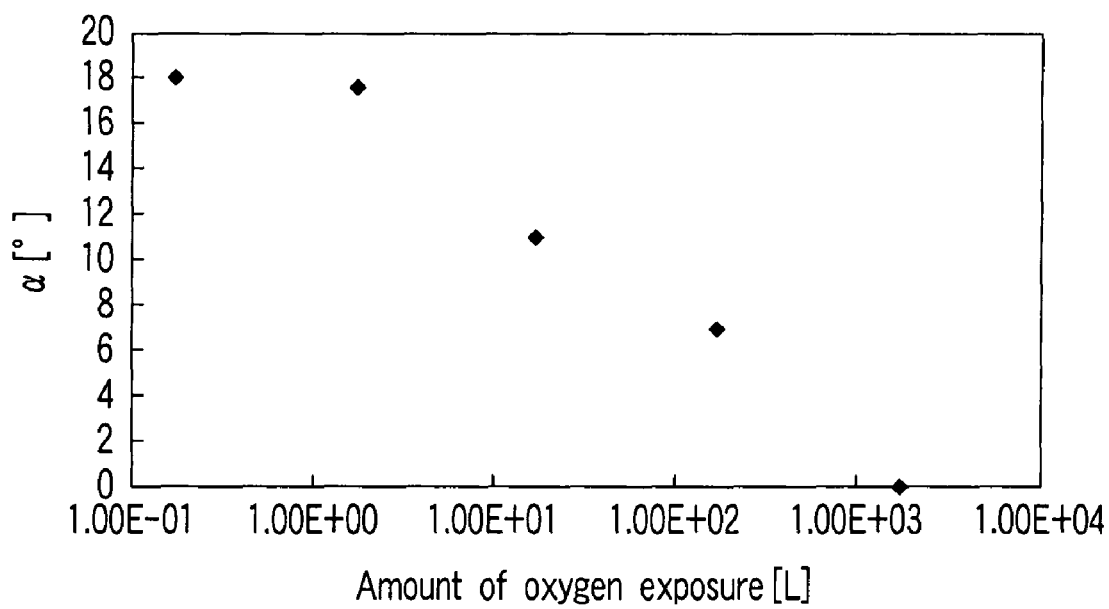
FIG. 15 is a graph showing a relationship between an amount of oxygen exposure after deposition of the first underlayer and a tilt angle α of the normal line to the (001) plane of the crystal grains in the magnetic recording layer.

FIG. 15 shows the relationship between the amount of oxygen exposure and the tilt angle α of the normal line to the (002) plane of the FePt layer, when the first underlayer is made of Ni-40 at % Ta and when the substrate temperature after forming the first underlayer is 120° C. As shown in FIG. 15, the angle α becomes 0° when the amount of oxygen exposure exceeds 170 L. The same tendency was observed in the medium using Ni-40 at % Nb, Ni-40 at % Zr, Ni-40 at % W, Ni-40 at % V, Ni-40 at % Mo or Ni-40 at % Hf as the first underlayer.

The rocking curve for the reflection from the (002) plane of the PtFe layer was evaluated with the XRD apparatus, wherein φ and φ in FIG. 4 were made 0°, 2θ was fixed to 48.5°, and ω (θ in FIG. 4) was changed in the range form 0 to 48.5°. FIG. 16 shows the rocking curve of the medium whose α is 0°. FIG. 17 shows the rocking curve of the medium whose α is 12°. As shown in FIG. 16, the medium having α of 0° shows a maximum intensity in the vicinity of ω of 24°. In contrast, as shown in FIG. 17, the curve has no maximum in the vicinity of ω of 24° and shows separated two peaks in the medium whose α is 12°.

The results of evaluation of the structure by the θ-2θ method with the XRD apparatus showed that all of the magnetic layers contained crystal grains forming the L1$_0$ structure.

SNR, OW characteristics and thermal demagnetization factor of the media (Nos. 1-1 to 1-28) having a tilt angle α in the vicinity of 0°, 3°, 9° or 25° are shown in Table 1. The first underlayer of each medium is Ni-40 at % Ta, Ni-40 at % Nb, Ni-40 at % Zr, Ni-40 at % W, Ni-40 at % V, Ni-40 at % Mo or Ni-40 at % Hf.

The planar TEM observation of each layer in each magnetic recording medium revealed that the Co-5 at % Zr-5 at %-Nb layer and the first underlayer were amorphous, while the Cr layer contained crystal grains with a size of 6 to 9 nm, and the magnetic recording layer contained crystal grains with a size of 5 to 8 nm.

Comparative Example 1

A conventional perpendicular magnetic recording medium using a magnetic recording layer of non-ordered alloy was manufactured in Comparative Example 1 as follows.

As in Example 1, predetermined targets were set in respective vacuum chambers of the sputtering apparatus (trade name C-3010, manufactured by Anelva corporation), a glass substrate with a diameter of 2.5 inches (trade name TS-10SX, manufactured by OHARA INC.) was loaded and the chambers were evacuated to a pressure of $1\times10^{-6}$ Pa or less. A soft underlayer of Co-5 wt % Zr-5 wt % Nb with a thickness of 100 nm, a Ta layer with a thickness of 10 nm, a Pt layer with a thickness of 5 nm, a Ru layer with a thickness of 20 nm and a magnetic recording layer of (78 at % Co-10 at % Cr-12 at % Pt)-7 at % SiO$_2$ and a protective layer of C with a thickness of 5 nm were sequentially deposited on the glass substrate. The Ar pressures for depositing the CoZrNb, Ta, Pt, Ru, CoCrPt—SiO$_2$ and C were 0.7, 0.7, 0.7, 2, 2 and 0.7 Pa, respectively. The films were deposited by DC sputtering with a power of 700 W for every target. The substrate was taken out of the sputtering apparatus, and perfluoropolyether (PFPE) as a lubricant was applied to the surface of the protective layer at a thickness of 13 Å by dipping to manufacture a magnetic recording medium.

Table 1 shows SNR, OW characteristics and thermal demagnetization factor of the medium in Comparative Example 1 evaluated by the same method as in Example 1.

Comparative Example 2

A conventional perpendicular magnetic recording layer using a magnetic medium made of an ordered alloy was manufactured in Comparative Example 2 as follows.

As in Example 1, predetermined targets were set in respective vacuum chambers of the sputtering apparatus (trade name C-3010, manufactured by Anelva corporation), a glass substrate with a diameter of 2.5 inches (trade name TS-10SX, manufactured by OHARA INC.) was loaded, and the vacuum chambers were evacuated to a pressure of $1\times10^{-6}$ Pa or less. Then, a soft underlayer of Co-5 at % Zr-5 at % Nb with a thickness of 100 nm, and an underlayer of Pt with a thickness of 12 nm were deposited on the glass substrate. After heating the surface of the substrate to 320° C. with an IR lamp heater, a magnetic recording layer of Fe-47 at % Pt with a thickness of 10 nm was deposited. A protective layer of C with a thickness of 5 nm was deposited thereon. The Ar pressures in depositing CoZrNb, Pt, FePt and C were 0.7 Pa, 0.7 Pa, 10 Pa and 0.7 Pa, respectively. All the layers were deposited by DC sputtering with a power of 700 W for every target. The substrate was taken out of the sputtering apparatus, and perfluoropolyether (PFPE) as a lubricant was applied to the surface of the protective layer by dipping at a thickness of 13 Å to manufacture the magnetic recording medium.

It was found from evaluation of orientation of the crystal plane by the polar figure method as in Example 1 that the tilt angle of the normal line to the (002) plane of the FePt layer of the medium in Comparative Example 2 was about 58°. It was also found from evaluation of the structure by the θ-2θ method with the XDR apparatus that the magnetic layer of the medium in Comparative Example 2 contained crystal grains of the L1$_0$ structure, and was a (111) orientation film.

Table 1 shows SNR, OW characteristics and thermal demagnetization factor of the medium in Comparative Example 2 as evaluated by the same method as in Example 1.

TABLE 1

| No. | First underlayer | α [°] | SNR [dB] | OW [dB] | $V_{1000}/V_0$ |
|---|---|---|---|---|---|
| 1-1 | Ni—40%Ta | 0 | 14.6 | 34 | 0.995 |
| 1-2 | Ni—40%Ta | 3.0 | 16.5 | 41 | 0.998 |
| 1-3 | Ni—40%Ta | 9.1 | 17.2 | 43 | 0.998 |
| 1-4 | Ni—40%Ta | 25.0 | 16.0 | 46 | 0.998 |
| 1-5 | Ni—40%Nb | 0 | 14.6 | 34 | 0.995 |
| 1-6 | Ni—40%Nb | 2.9 | 16.0 | 40 | 0.997 |
| 1-7 | Ni—40%Nb | 8.9 | 17.0 | 42 | 0.997 |
| 1-8 | Ni—40%Nb | 24.9 | 16.0 | 45 | 0.997 |
| 1-9 | Ni—40%W | 0 | 14.5 | 33 | 0.993 |
| 1-10 | Ni—40%W | 3.0 | 16.2 | 40 | 0.995 |
| 1-11 | Ni—40%W | 9.1 | 16.9 | 44 | 0.995 |
| 1-12 | Ni—40%W | 24.8 | 16.3 | 45 | 0.995 |
| 1-13 | Ni—40%Zr | 0 | 14.8 | 35 | 0.995 |
| 1-14 | Ni—40%Zr | 3.0 | 16.5 | 41 | 0.998 |
| 1-15 | Ni—40%Zr | 9.1 | 17.4 | 44 | 0.998 |
| 1-16 | Ni—40%Zr | 25.0 | 16.0 | 46 | 0.998 |
| 1-17 | Ni—40%V | 0 | 14.6 | 34 | 0.994 |
| 1-18 | Ni—40%V | 3.2 | 16.1 | 40 | 0.997 |
| 1-19 | Ni—40%V | 9.1 | 17.0 | 43 | 0.997 |
| 1-20 | Ni—40%V | 24.9 | 16.4 | 45 | 0.997 |
| 1-21 | Ni—40%Mo | 0 | 14.5 | 34 | 0.995 |
| 1-22 | Ni—40%Mo | 3.0 | 15.9 | 41 | 0.997 |
| 1-23 | Ni—40%Mo | 9.0 | 16.8 | 43 | 0.997 |
| 1-24 | Ni—40%Mo | 24.9 | 16.1 | 44 | 0.997 |
| 1-25 | Ni—40%Hf | 0 | 14.4 | 33 | 0.994 |
| 1-26 | Ni—40%Hf | 3.0 | 16.1 | 40 | 0.998 |
| 1-27 | Ni—40%Hf | 9.1 | 16.9 | 42 | 0.998 |
| 1-28 | Ni—40%Hf | 24.8 | 16.3 | 45 | 0.998 |
| Comparative example 1 | Conventional medium | — | 14.8 | 36 | 0.925 |
| Comparative example 2 | Pt | 55.9 | 12.0 | 42 | 0.992 |

Table 1 shows the followings. The perpendicular magnetic recording medium of Comparative Example 1 having a magnetic recording layer made of a non-ordered alloy shows 7% or more of attenuation in reproduced output after the magnetic recording medium is left stand at 70° C. for 1000 seconds. In contrast, the media of Nos. 1-1 to 1-28 and Comparative Example 2 having a magnetic recording layer made of an ordered alloy shows less than 1% of attenuation, which means that the thermal fluctuation resistance is remarkably improved.

The medium of Comparative Example 2 having a tilt angle α of about 58° shows remarkably degraded SNR as compared with the medium in Comparative Example 1. All the media with the tilt angle of 0° of Nos. 1-1 to 1-28 show degraded OW characteristics and slightly degraded SNR as compared with the medium of Comparative Example 1. In contrast, all the media with a of larger than 0° of Nos. 1-1 to 1-28 show remarkably improved SNR and OW characteristics as compared with the magnetic recording medium of Comparative Example 1.

FIG. 18 shows the change of SNR with respect to the tilt angle α of the normal line to the (002) plane of the FePt film for the medium whose first underlayer is made of Ni-40 at % Ta. FIG. 19 shows the change of OW with respect to the tilt angle α of the normal line to the (002) plane of the FePt film for the medium whose first underlayer is made of Ni-40 at % Ta. It is found from FIGS. 18 and 19 that SNR and OW characteristics are remarkably improved in the case where the tilt angle α is in the range of 3 to 25°. The same tendency was also observed in the media whose first underlayer was Ni-40 at % Nb, Ni-40 at % Zr, Ni-40 at % W, Ni-40 at % V, Ni-40 at % Mo or Ni-40 at % Hf.

Figure 20:
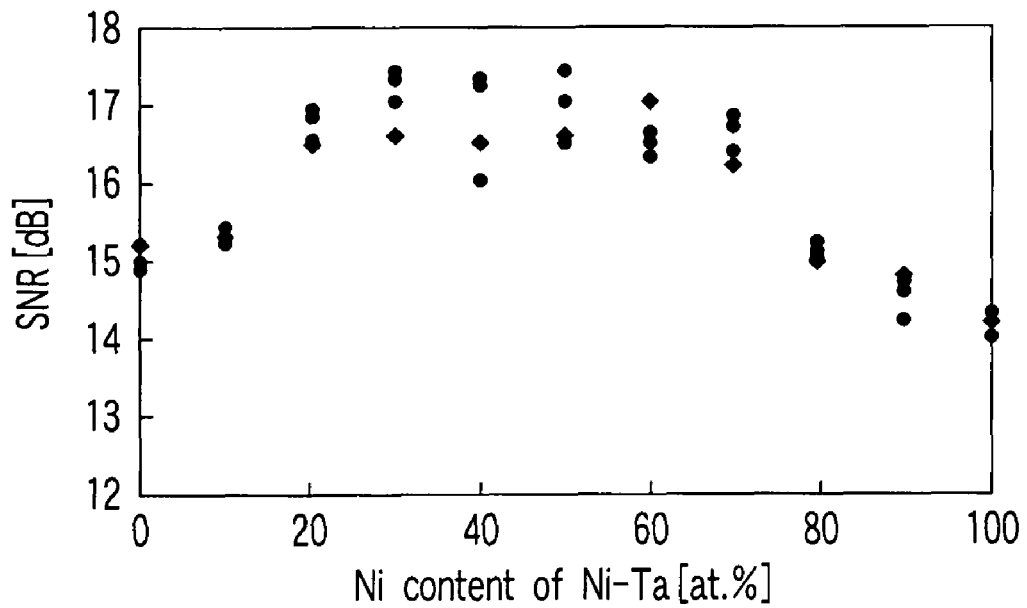
FIG. 20 is a graph showing a relationship between a Ni content of the Ni—Ta alloy (first underlayer) and SNR.

FIG. 20 shows the relationship between the Ni content of the Ni—Ta alloy and SNR for the medium having a first underlayer of a Ni—Ta alloy. As shown in FIG. 20, the SNR was remarkably improved where the Ni content was in the range of 20 to 70 at %, and was particularly remarkably improved where the Ni content was in the range of 30 to 50 at %. It was also found that the medium having the first underlayer of the Ni—Ta alloy had remarkably improved SNR as compared with the medium having the first underlayer of simple Ta. The same tendency was also observed when Ni—Nb, Ni—Zr, Ni—W, Ni—V, Ni—Mo or Ni—Hf alloy was used as the first underlayer.

Example 2

In this Example, magnetic recording media similar to those in Example 1 were manufactured except that the second underlayer was formed of a Cr—Ti alloy or Cr—Ru alloy.

As in Example 1, predetermined targets were set in respective vacuum chambers of the sputtering apparatus (trade name C-3010, manufactured by Anelva corporation), a glass substrate (trade name TS-10SX, manufactured by OHARA INC.) with a diameter of 2.5 inches was loaded, and the pressure in the vacuum chambers were evacuated to $1\times10^{-6}$ Pa or less. Then, a soft underlayer of Co-5 at % Zr-5 at % Nb with a thickness of 100 nm and a Ni-40 at % Ta underlayer (first underlayer) with a thickness of 7 nm were deposited on the glass substrate. After heating the surface of the substrate to 170° C. with an IR lamp heater, oxygen gas was introduced into the second chamber to set the oxygen partial pressure to $2\times10^{-3}$ Pa so that the Ni-40 at % Ta underlayer was exposed to oxygen for 5 seconds. Subsequently, a Cr—Ti alloy underlayer (second underlayer) with a thickness of 5 nm, a magnetic recording layer of Fe-47 at % Pt with a thickness of 10 nm, and a protective layer of C with a thickness of 5 nm were deposited on the first underlayer. The Cr—Ti alloy underlayer was deposited by dual target co-sputtering using the Cr target and Ti target. The Ti content of Cr—Ti was changed by changing the powers applied to the Cr target and Ti target, respectively. The substrate was taken out of the sputtering apparatus, and perfluoropolyether (PFPE) as a lubricant was applied to the surface of the protective layer with a thickness of 13 Å by dipping to manufacture the magnetic recording medium.

Media having a Cr—Ru alloy underlayer in place of the Cr—Ti alloy underlayer were manufactured by the same procedure.

The R/W characteristics, crystal structure and orientation of the crystal plane were evaluated for the resultant magnetic recording media as in Example 1.

The results of evaluation of the structure by the θ-2θ method showed that all the magnetic layers contained crystal grains of the $L1_0$ structure.

Planar TEM observation for each layer revealed that both the Co-5 at % Zr-5 at % Nb layer and the first underlayer were amorphous, while the Cr alloy layer and magnetic recording layer contained crystal grains with a grain size in the ranges of 6 to 9 nm and of 5 to 8 nm, respectively.

All the media showed excellent thermal fluctuation resistance similar to the media in Example 1.

Figure 21:
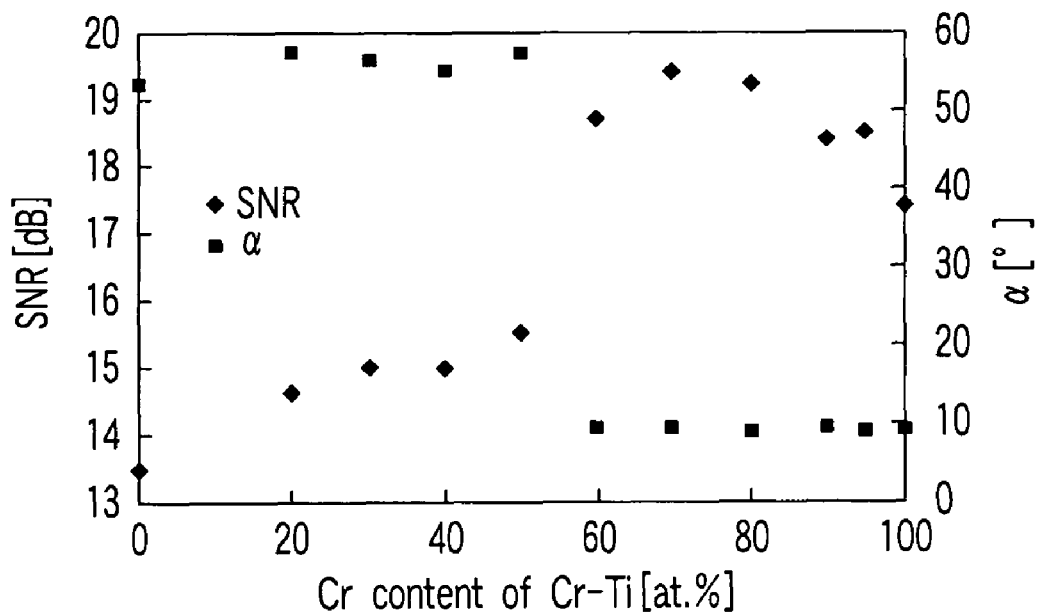
FIG. 21 is a graph showing a relationship between a Cr content of the Cr—Ti alloy (second underlayer) and SNR as well as a tilt angle α of the normal line to the (001) plane of the crystal grains in the magnetic recording layer.

FIG. 21 shows the relationship between the Cr content of the second underlayer made of an Cr—Ti alloy and SNR as well as α. As shown in FIG. 21, improvement of SNR was remarkable by adding Ti in the range of 5 to 40 at % (Cr content in the range of 95 to 60 at %), and it was found that the improvement was more excellent than in Example 1 using Cr as the second underlayer. On the other hand, it was found that, when the Cr content is less than 60 at %, the tilt angle α was abruptly changed, leading to degrades SNR.

FIG. 22 shows the relationship between the Cr content of the second underlayer made of an Cr—Ru alloy and SNR as well as α. As shown in FIG. 22, the media using the Cr—Ru alloy for the second underlayer showed the same tendency as in FIG. 21 for the media using a Cr—Ti alloy.

Example 3

In this example, magnetic recording media having the structure shown in FIG. 23 were manufactured. The magnetic recording medium in FIG. 23 has a structure comprising a soft underlayer 11, a first underlayer 21, a second underlayer 22, a third underlayer 23, magnetic recording layer 31 and a protective layer 41 sequentially stacked on a substrate 1. Various materials were used for the first underlayer 21, second underlayer 22 and third underlayer 23. The substrate temperature and the oxygen partial pressure were variously changed for allowing oxygen to be adsorbed on the first underlayer as in Example 1.

As in Example 1, predetermined targets were set in respective vacuum chambers of the sputtering apparatus (trade name C-3010, manufactured by Anelva corporation), a glass substrate with a diameter of 2.5 inches was loaded, and the vacuum chambers were evacuated to a pressure of $1\times10^{-6}$ or less. A soft underlayer of Co-5 at % Zr-5 at % Nb with a thickness of 100 nm and a Ni-40 at % Ta underlayer (first underlayer) with a thickness of 7 nm were deposited on the glass plate. The surface of the substrate was then heated with an IR lamp heater. The substrate temperature was changed in the range of 25 to 280° C. by adjusting the heating time. After heating the substrate, oxygen gas was introduced into the chamber with a controlled flow rate, and the surface of the Ni-40 at % Ta underlayer was exposed to oxygen for 5 seconds while the oxygen partial pressure was changed in the range of $4.5\times10^{-6}$ Pa to $4.5\times10^{-3}$ Pa. Subsequently, a Cr underlayer (second underlayer) with a thickness of 5 nm was deposited on the first underlayer. After heating the substrate to 320° C. as in Example 1, a Pt film (third underlayer) with a thickness of 10 nm was deposited on the second underlayer by DC sputtering with a power of 100 W under an Ar pressure of 8 Pa. A magnetic recording layer of Fe-47 at % Pt with a thickness of 10 nm was deposited on the third underlayer by DC sputtering with a power of 200 W under an Ar pressure of 10 Pa. A protective layer of C with a thickness of 5 nm was further deposited thereon. The substrate was taken out of the sputtering apparatus, and perfluoropolyether (PFPE) as a lubricant was applied to the surface of the protective layer by dipping at a thickness of 13 Å to manufacture the magnetic recording medium.

The combination of the first underlayer, second underlayer and third underlayer was changed as shown in Tables 2 to 4 to manufacture magnetic recording media by the similar method to that described above.

The first underlayer was selected from Ni-40 at % Ta alloy, Ni-40 at % Nb alloy, Ni-40 at % Zr alloy, Ni-40 at % W alloy, Ni-40 at % V alloy, Ni-40 at % Mo alloy and Ni-40 at % Hf alloy. The second underlayer was selected from Cr, Cr-25 at % Ti alloy and Cr-25 at % Ru alloy. The third underlayer was selected from Pt, Pd, Ir, Ag and Cu, or no third layer was provided.

The resultant magnetic recording media were evaluated with respect to the R/W characteristics, crystal structure and orientation of crystal plane as in Example 1.

The tilt angle $\beta$ of the (200) plane of crystal grains in the third layer was evaluated using the pole figure method as in Example 1.

For each medium, the oxygen distribution in the depth direction was evaluated by SIMS using $Cs^+$ as a primary ion under an acceleration voltage of 1 kV.

The results are shown in Tables 2 to 4.

TABLE 2

| No. | First underlayer | Second underlayer | Third underlayer | α [°] | β [°] | SNR [dB] | $V_{1000}/V_0$ |
|---|---|---|---|---|---|---|---|
| 1-4  | Ni—40%Ta | Cr | None | 9.1 |     | 17.2 | 0.998 |
| 3-1  | Ni—40%Ta | Cr | Pt   | 9.0 | 9.0 | 20.8 | 0.998 |
| 3-2  | Ni—40%Ta | Cr | Pd   | 9.1 | 9.0 | 20.7 | 0.998 |
| 3-3  | Ni—40%Ta | Cr | Ir   | 9.0 | 9.1 | 20.4 | 0.998 |
| 3-4  | Ni—40%Ta | Cr | Ag   | 9.0 | 9.0 | 20.4 | 0.998 |
| 3-5  | Ni—40%Ta | Cr | Cu   | 8.9 | 8.9 | 20.7 | 0.998 |
| 1-7  | Ni—40%Nb | Cr | None | 8.9 |     | 17.0 | 0.997 |
| 3-6  | Ni—40%Nb | Cr | Pt   | 9.1 | 9.0 | 20.9 | 0.997 |
| 3-7  | Ni—40%Nb | Cr | Pd   | 9.2 | 9.1 | 20.8 | 0.997 |
| 3-8  | Ni—40%Nb | Cr | Ir   | 9.0 | 8.9 | 20.4 | 0.997 |
| 3-9  | Ni—40%Nb | Cr | Ag   | 8.9 | 8.9 | 20.6 | 0.997 |
| 3-10 | Ni—40%Nb | Cr | Cu   | 8.9 | 8.8 | 20.8 | 0.997 |
| 1-15 | Ni—40%Zr | Cr | None | 9.1 |     | 17.4 | 0.998 |
| 3-11 | Ni—40%Zr | Cr | Pt   | 9.1 | 8.9 | 20.9 | 0.998 |
| 3-12 | Ni—40%Zr | Cr | Pd   | 9.1 | 9.0 | 20.9 | 0.998 |
| 3-13 | Ni—40%Zr | Cr | Ir   | 9.0 | 9.1 | 20.3 | 0.998 |
| 3-14 | Ni—40%Zr | Cr | Ag   | 8.9 | 9.1 | 20.2 | 0.998 |
| 3-15 | Ni—40%Zr | Cr | Cu   | 9.0 | 8.9 | 20.8 | 0.998 |

TABLE 3

| No. | First underlayer | Second underlayer | Third underlayer | α [°] | β [°] | SNR [dB] | $V_{1000}/V_0$ |
|---|---|---|---|---|---|---|---|
| 2-1  | Ni—40%Ta | Cr—25%Ti | None | 9.1 |     | 19.2 | 0.998 |
| 3-16 | Ni—40%Ta | Cr—25%Ti | Pt   | 9.0 | 9.0 | 20.9 | 0.998 |
| 3-17 | Ni—40%Ta | Cr—25%Ti | Pd   | 9.1 | 9.0 | 20.9 | 0.998 |
| 3-18 | Ni—40%Ta | Cr—25%Ti | Ir   | 9.0 | 9.1 | 20.5 | 0.998 |
| 3-19 | Ni—40%Ta | Cr—25%Ti | Ag   | 9.0 | 9.0 | 20.4 | 0.998 |
| 3-20 | Ni—40%Ta | Cr—25%Ti | Cu   | 8.9 | 8.9 | 21.0 | 0.998 |
| 2-2  | Ni—40%Nb | Cr—25%Ti | None | 8.9 |     | 19.0 | 0.997 |
| 3-21 | Ni—40%Nb | Cr—25%Ti | Pt   | 9.1 | 9.0 | 20.8 | 0.997 |
| 3-22 | Ni—40%Nb | Cr—25%Ti | Pd   | 9.2 | 9.1 | 20.8 | 0.997 |
| 3-23 | Ni—40%Nb | Cr—25%Ti | Ir   | 9.0 | 8.9 | 20.4 | 0.997 |
| 3-24 | Ni—40%Nb | Cr—25%Ti | Ag   | 8.9 | 8.9 | 20.6 | 0.997 |
| 3-25 | Ni—40%Nb | Cr—25%Ti | Cu   | 8.9 | 8.8 | 20.9 | 0.997 |
| 2-3  | Ni—40%Zr | Cr—25%Ti | None | 9.1 |     | 19.1 | 0.998 |
| 3-26 | Ni—40%Zr | Cr—25%Ti | Pt   | 9.1 | 9.0 | 20.9 | 0.998 |
| 3-27 | Ni—40%Zr | Cr—25%Ti | Pd   | 9.1 | 8.9 | 21.0 | 0.998 |
| 3-28 | Ni—40%Zr | Cr—25%Ti | Ir   | 9.0 | 9.1 | 20.2 | 0.998 |
| 3-29 | Ni—40%Zr | Cr—25%Ti | Ag   | 8.9 | 9.1 | 20.2 | 0.998 |
| 3-30 | Ni—40%Zr | Cr—25%Ti | Cu   | 9.0 | 8.9 | 20.8 | 0.998 |

TABLE 4

| No. | First underlayer | Second underlayer | Third underlayer | α [°] | β [°] | SNR [dB] | $V_{1000}/V_0$ |
|---|---|---|---|---|---|---|---|
| 2-4  | Ni—40%Ta | Cr—25%Ru | None | 9.0 |     | 18.8 | 0.997 |
| 3-31 | Ni—40%Ta | Cr—25%Ru | Pt   | 9.0 | 9.0 | 20.7 | 0.997 |
| 3-32 | Ni—40%Ta | Cr—25%Ru | Pd   | 9.1 | 9.0 | 20.7 | 0.997 |
| 3-33 | Ni—40%Ta | Cr—25%Ru | Ir   | 9.0 | 9.1 | 20.5 | 0.998 |
| 3-34 | Ni—40%Ta | Cr—25%Ru | Ag   | 9.0 | 9.0 | 20.4 | 0.998 |
| 3-35 | Ni—40%Ta | Cr—25%Ru | Cu   | 8.9 | 8.9 | 20.9 | 0.997 |
| 2-5  | Ni—40%Nb | Cr—25%Ru | None | 9.1 |     | 18.9 | 0.997 |
| 3-36 | Ni—40%Nb | Cr—25%Ru | Pt   | 9.1 | 9.0 | 20.9 | 0.997 |
| 3-37 | Ni—40%Nb | Cr—25%Ru | Pd   | 9.2 | 9.1 | 20.8 | 0.997 |
| 3-38 | Ni—40%Nb | Cr—25%Ru | Ir   | 9.0 | 8.9 | 20.4 | 0.998 |
| 3-39 | Ni—40%Nb | Cr—25%Ru | Ag   | 8.9 | 8.9 | 20.5 | 0.997 |
| 3-40 | Ni—40%Nb | Cr—25%Ru | Cu   | 8.9 | 8.8 | 20.9 | 0.997 |
| 2-6  | Ni—40%Zr | Cr—25%Ru | None | 8.9 |     | 19.0 | 0.998 |
| 3-41 | Ni—40%Zr | Cr—25%Ru | Pt   | 9.1 | 8.9 | 21.0 | 0.998 |
| 3-42 | Ni—40%Zr | Cr—25%Ru | Pd   | 9.1 | 8.9 | 20.8 | 0.998 |
| 3-43 | Ni—40%Zr | Cr—25%Ru | Ir   | 9.0 | 9.1 | 20.2 | 0.997 |
| 3-44 | Ni—40%Zr | Cr—25%Ru | Ag   | 8.9 | 9.1 | 20.2 | 0.998 |
| 3-45 | Ni—40%Zr | Cr—25%Ru | Cu   | 9.0 | 8.9 | 20.9 | 0.998 |

Table 2 shows the followings. The magnetic recording media of Nos. 3-1 to 3-15 having a crystalline underlayer selected from Pt, Pd, Ir, Ag and Cu inserted as the third layer exhibit more improved SNR as compared with the recording media of Nos. 1-4, 1-7 and 1-15 having only the first underlayer and second underlayer with no third layer.

Table 3 shows the followings. The magnetic recording media of Nos. 3-16 to 3-30 having an inserted third layer, among the media using the Cr-25 at % Ti alloy as the second underlayer, also exhibit more improved SNR as compared with the magnetic recording media of Nos. 2-1, 2-2 and 2-3 having only the first underlayer and second underlayer with no third layer as the results in table 2.

Table 4 shows the followings. The magnetic recording media of Nos. 3-31 to 3-45 having an inserted third underlayer, among the media using the Cr-25 at % Ru alloy as the second underlayer, also exhibit more improved SNR as compared with the magnetic recording media of Nos. 2-4, 2-5 and 2-6 having only the first underlayer and second underlayer with no third layer as the results in table 2.

FIG. 24 shows the relationship between the tilt angle $\beta$ of the normal line to the (200) plane of Pt and the tilt angle $\alpha$ of the normal line to the (002) plane of FePt as well as SNR in the medium using Ni-40 at % Ta alloy, Cr and Pt as the first, second and third underlayers, respectively. It was found that the SNR was remarkably improved when $\beta$ was in the range of 3 to 25°. The same tendency was also observed in the media using the Ni-40 at % Ta alloy, Ni-40 at % Nb alloy, Ni-40 at % Zr alloy, Ni-40 at % W alloy, Ni-40 at % V alloy, Ni-40 at % Mo alloy or Ni-40 at % Hf alloy as the first underlayer; or using Cr, Cr-25 at % Ti alloy or Cr-25 at % Ru alloy as the second underlayer; or using Pt, Pd, Ir, Ag or Cu as the third underlayer.

FIG. 25 shows the relationship between the ratio of the oxygen amount remaining at the interface of Ni—Ta/Cr to the oxygen amount remaining at the interface of Cr/Pt, i.e., $O_{12}/O_{23}$ and SNR in the media using the Ni-40 at % Ta alloy, Cr and Pt as the first, second and third underlayers, respectively. As shown in the drawing, a approaches zero when the ratio of the amount of remaining oxygen at the interface of Cr/Pt to the oxygen amount remaining at the interface of Ni—Ta/Cr exceeds unity, resulting in degraded SNR. The same tendency was also observed in the medium using the Ni-40 at % Ta alloy, Ni-40 at % Nb alloy, Ni-40 at % Zr alloy, Ni-40 at % W alloy, Ni-40 at % V alloy, Ni-40 at % Mo alloy or Ni-40 at % Hf alloy as the first underlayer; or using Cr, Cr-25 at % Ti alloy or Cr-25 at % Ru alloy as the second underlayer; or using Pt, Pd, Ir, Ag or Cu as the third underlayer.

It was found from the results of evaluation by the θ-2θ method that all the magnetic layers contained crystal grains of the $L1_0$ structure.

Planar TEM observation for each layer as in Example 1 revealed that both the Co-5 at % Zr-5 at % Nb layer and the first underlayer were amorphous, while the second underlayer, third underlayer and magnetic recording layer contained crystal grains with average particle size in the ranges of 6 to 7 nm, 5 to 6 nm and 4 to 5 nm, respectively.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A magnetic recording medium comprising:
   a substrate;
   a first underlayer formed on the substrate and comprising an amorphous alloy containing Ni;
   a crystalline second underlayer formed on the first underlayer and comprising simple Cr or an alloy containing Cr;
   a nonmagnetic crystalline third underlayer formed on the second underlayer and comprising at least one element selected from the group consisting of Pt, Pd, Ag, Cu and Ir; and
   a magnetic recording layer formed on the third underlayer and comprising at least one element of Fe and Co and at least one element of Pt and Pd, and containing magnetic crystal grains having an $L1_0$ structure,
   wherein an oxygen amount remaining on an upper surface of the second underlayer is larger than an oxygen amount remaining on a lower surface of the second underlayer,
   wherein the third underlayer contains crystal grains having a (100) plane oriented with a tilt angle in a range of 3 to 25° to a normal line to a medium plane, and
   wherein a normal line to a (001) plane of the magnetic crystal grains in the magnetic recording layer is oriented with a tilt angle in a range of 3 to 25° to a normal line to a medium plane.

2. The magnetic recording medium according to claim 1, wherein the amorphous alloy is selected from the group consisting of an. Ni—Nb alloy, an Ni—Ta alloy, an Ni—Zr alloy, an Ni—W alloy, an Ni—Mo alloy, an Ni—Hf alloy, and an Ni—V alloy.

3. The magnetic recording medium according to claim 1, wherein an Ni content of the amorphous alloy is in a range of 20 to 70 at %.

4. The magnetic recording medium according to claim 1, wherein the alloy containing Cr is a Cr—Ti alloy or a Cr—Ru alloy.

5. The magnetic recording medium according to claim 4, wherein a Ti content of the Cr—Ti alloy is in a range of 5 to 40 at %, and a Ru content of the Cr—Ru alloy is in a range of 5 to 40 at %.

6. The magnetic recording medium according to claim 1, further comprising a soft underlayer between the first underlayer and the substrate.

7. A magnetic recording apparatus comprising the magnetic recording medium according to claim 1 and a read/write head.

* * * * *